US012663200B2

(12) United States Patent
Lim et al.

(10) Patent No.: US 12,663,200 B2
(45) Date of Patent: Jun. 23, 2026

(54) DOOR OPENING DEVICE AND REFRIGERATOR HAVING THE SAME

(71) Applicant: Samsung Electronics Co., Ltd., Suwon-si (KR)

(72) Inventors: Suhyeong Lim, Suwon-si (KR); Joongkyung Park, Suwon-si (KR); Seunghoon Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 183 days.

(21) Appl. No.: 18/358,729

(22) Filed: Jul. 25, 2023

(65) Prior Publication Data

US 2024/0125537 A1 Apr. 18, 2024

Related U.S. Application Data

(63) Continuation of application No. PCT/KR2023/008521, filed on Jun. 20, 2023.

(30) Foreign Application Priority Data

Oct. 14, 2022 (KR) ........................ 10-2022-0132773

(51) Int. Cl.
*F25D 23/02* (2006.01)
*E05B 1/00* (2006.01)
(Continued)

(52) U.S. Cl.
CPC ............ *F25D 23/028* (2013.01); *E05F 11/54* (2013.01); *F25D 23/025* (2013.01); (Continued)

(58) Field of Classification Search
CPC ...... F25D 23/028; F25D 25/025; F25D 23/02; F25D 23/021; E05Y 2900/31; E05F 11/54; E05B 17/033
See application file for complete search history.

(56) References Cited

U.S. PATENT DOCUMENTS 5,908,228 A 6/1999 Lee
8,025,349 B2 9/2011 Lim et al.
(Continued)

FOREIGN PATENT DOCUMENTS

CN 105466101 A * 4/2016
EP 0598979 B1 11/1996
(Continued)

OTHER PUBLICATIONS

International Search Report and Written Opinion of the International Searching Authority dated Oct. 17, 2023, in connection with International Application No. PCT/KR2023/008521, 10 pages.
(Continued)

*Primary Examiner* — Kimberley S Wright

(57) ABSTRACT

Provided is a refrigerator including a main body, a storage compartment provided inside the main body with a front side that is open, a drawer-type door slidably coupled to the main body to open and close the storage compartment, and including a door cap having a handle pocket, and a door opening device coupled to the door cap and configured to open the drawer-type door. The door opening device includes a handle lever rotatably coupled to the door cap. The door opening device includes a slider disposed at a rear of the handle lever to perform straight linear motion in an upper-to-lower direction by the handle lever. The door opening device includes a pusher coupled at a rear of the slider to perform straight linear motion in a front-to-rear direction, and, while the slider is moving upward, perform straight linear motion rearward to press the main body to open the drawer-type door.

20 Claims, 23 Drawing Sheets

(51) Int. Cl.
*E05B 17/00* (2006.01)
*E05F 11/54* (2006.01)
*F25D 25/02* (2006.01)
*E05F 11/00* (2006.01)

(52) U.S. Cl.
CPC ............ *F25D 25/025* (2013.01); *E05F 11/00* (2013.01); *E05Y 2900/31* (2013.01); *F25D 23/021* (2013.01)

(56) References Cited

U.S. PATENT DOCUMENTS

| | | | | |
|---|---|---|---|---|
| 8,506,028 | B2 | 8/2013 | Lim et al. | |
| 9,127,879 | B2 | 9/2015 | Hwang et al. | |
| 9,506,685 | B2 | 11/2016 | Park et al. | |
| 9,897,368 | B2 | 2/2018 | Lee | |
| 11,761,702 | B2 | 9/2023 | Choi et al. | |
| 2009/0179540 | A1* | 7/2009 | Seo | E05B 17/0033 312/405 |
| 2009/0205357 | A1* | 8/2009 | Lim | F25D 23/021 62/449 |
| 2011/0132024 | A1* | 6/2011 | Lim | E05B 17/0033 62/449 |
| 2012/0280608 | A1* | 11/2012 | Park | E05B 1/0015 49/460 |
| 2013/0270990 | A1* | 10/2013 | Park | F25D 23/028 312/405 |
| 2014/0319989 | A1 | 10/2014 | Hwang et al. | |
| 2015/0176886 | A1* | 6/2015 | Lee | F25D 23/025 312/405 |
| 2015/0292793 | A1 | 10/2015 | Bischoff et al. | |
| 2017/0336131 | A1* | 11/2017 | Lee | E05F 11/10 |
| 2019/0024965 | A1* | 1/2019 | Park | F25D 23/028 |
| 2019/0338999 | A1 | 11/2019 | Lee | |
| 2022/0011040 | A1 | 1/2022 | Son | |
| 2022/0214096 | A1* | 7/2022 | Han | E05B 7/00 |

FOREIGN PATENT DOCUMENTS

| | | | |
|---|---|---|---|
| JP | 3871474 | B2 | 1/2007 |
| KR | 10-1998-0028006 | A | 7/1998 |
| KR | 20-1999-0021548 | U | 6/1999 |
| KR | 10-2009-0074442 | A | 7/2009 |
| KR | 20-2009-0008042 | U | 8/2009 |
| KR | 10-2013-0053921 | A | 5/2013 |
| KR | 10-2013-0116738 | A | 10/2013 |
| KR | 10-2014-0072370 | A | 6/2014 |
| KR | 10-2015-0050542 | A | 5/2015 |
| KR | 10-1600310 | B1 | 3/2016 |
| KR | 10-2017-0129541 | A | 11/2017 |
| KR | 10-2018-0009163 | A | 1/2018 |
| KR | 10-1827340 | B1 | 2/2018 |
| KR | 10-1952680 | B1 | 2/2019 |
| KR | 10-2019-0126633 | A | 11/2019 |
| KR | 10-2021-0008709 | A | 1/2021 |
| KR | 10-2022-0007291 | A | 1/2022 |

OTHER PUBLICATIONS

Supplementary European Search Report dated Aug. 21, 2025, in connection with European Application No. 23877417.8, 6 pages.

* cited by examiner

DOOR OPENING DEVICE AND REFRIGERATOR HAVING THE SAME

CROSS-REFERENCE TO RELATED APPLICATIONS

This application is a Bypass Continuation of International Application No. PCT/KR2023/008521, filed Jun. 20, 2023, which is based on and claims priority under 35 U.S.C. § 119 to Korean Patent Application No. 10-2022-0132773, filed on Oct. 14, 2022 in the Korean Intellectual Property Office, the disclosures of which are incorporated herein by reference.

BACKGROUND

1. Field

The disclosure relates to a refrigerator with an improved door opening device for opening a drawer-type door having a recessed handle.

2. Description of the Related Art

A refrigerator is an appliance equipped with a main body having a storage compartment and a cold air supply system for supplying cold air to the storage compartment to keep foodstuffs in a fresh state. The storage compartment includes a refrigerating compartment maintained at about 0° C. to 5° C. to refrigerate and store food, and a freezing compartment maintained at about 0° C. to −30° C. to freeze and store food. A door may be provided on the front side of the main body to open and close the storage compartment. The door may be rotatably provided on the front side of the main body to open and close the storage compartment. In addition, the door may be provided as a drawer-type door to open and close the storage compartment.

The drawer-type door for opening and closing the storage compartment may be provided with a handle to be gripped by a user to insert or withdraw the drawer-type door. The handle may be provided in a recessed type handle.

In the case of a drawer-type door having a recessed handle, the amount of food stored in the drawer-type door may vary depending on the capacity of the storage compartment opened and closed by the drawer-type door. When the amount of stored food is large, the user needs a significant amount of force when withdrawing the drawer-type door by gripping the handle. That is, such a case may require a great force when the user opens the drawer-type door in a closed state during an operation of opening the drawer-type door.

To facilitate the opening of the drawer-type door, the drawer-type door may be provided with a door opening device for opening the drawer-type door. When the user operates the door opening device while gripping the recessed handle in a closed state of the drawer-type door, the drawer-type door may be partially opened, thereby allowing the user to easily open the drawer-type door without a great force.

SUMMARY

Therefore, it is an object of the disclosure to provide a door opening device capable of operating in a narrow space and prevented from being exposed to the outside, and a refrigerator having the same.

It is another object of the disclosure to provide a door opening device capable of easily opening a drawer-type door while using a small force, and a refrigerator having the same.

It is another object of the disclosure to provide a door opening device capable of ensuring insulation thickness of a drawer-type door by allowing a slider connecting a handle lever and a pusher to perform straight linear motion in an upper-lower direction for the slider occupies a small space required for operation, and a refrigerator having the same.

It is another object of the disclosure to provide a door opening device that is improved to facilitate assembly while increasing rigidity and durability of assembly, and a refrigerator having the same.

The technical objectives of the present invention are not limited to the above, and other objectives may become apparent to those of ordinary skill in the art based on the following description.

According to an aspect of the disclosure, there is provided a refrigerator including: a main body; a storage compartment provided inside the main body with a front side that is open; a drawer-type door slidably coupled to the main body and configured to open and close the storage compartment, and including a door cap having a handle pocket; and a door opening device coupled to the door cap and configured to open the drawer-type door, wherein the door opening device includes: a handle lever rotatably coupled to the door cap; a slider disposed at a rear of the handle lever and configured to perform straight linear motion in an upper-to-lower direction by the handle lever; and a pusher coupled at a rear of the slider and configured to perform straight linear motion in a front-to-rear direction, and while the slider is moving upward, perform straight linear motion rearward to press the main body so as to open the drawer-type door.

The slider may include a first inclined surface configured to be in contact with the pusher, and the pusher may include a second inclined surface formed to correspond to the first inclined surface and configured to, while the slider is moving upward, slide along the first inclined surface such that the pusher moves rearward.

The refrigerator may further include a door bracket coupled to a central area of a lower end of the door cap, and the door opening device may be coupled to the door bracket.

The door bracket may include a handle lever assembly portion rotatably coupled with the handle lever; a slider assembly portion including a first guide rail coupled to the slider such that the slider is guided for straight linear motion in an upper-to-lower direction; and a pusher assembly portion coupled to the pusher such that the pusher has straight linear motion in a front-to rear direction.

The handle lever assembly portion may include a recessed portion formed as a recess from a surface of the handle lever assembly portion and configured to accommodate a part of the handle lever, and a plurality of rotation holes formed in the recessed portion for rotatably coupling with the handle lever.

The handle lever may include a bracket including a part that may be exposed to the handle pocket, and a reinforcing member coupled to the bracket and configured to reinforce the bracket.

The bracket may include a gripping portion exposed to the handle pocket, a plurality of catching hooks may be coupled with the reinforcing member, a pressing portion configured to press the slider during rotation of the handle lever, and a plurality of rotation shafts integrally formed with the bracket and rotatably coupled to the plurality of rotation holes.

The slider may include a guide protrusion configured to guide the slider for movement along the first guide rail; a sliding surface obliquely formed such that the pressing portion slidably moves while in contact with the sliding surface; and a separation preventing protrusion configured to prevent separation of the handle lever coupled to the handle lever assembly portion.

The pusher assembly portion may include a second guide rail configured to guide the pusher for straight linear motion in the front-to-rear direction, and a separation preventing bar forming an opening between the second guide rail and the separation preventing bar and configured to prevent separation of the pusher moving along the second guide rail, wherein the opening is formed to be open for the slider to push the main body.

The door opening device may further include an elastic member coupled to one of the plurality of rotation shafts such that the handle lever subjected to the rotation may return to an original position in response to a force applied to the handle lever being removed.

The elastic member may be prevented from separating from the one of the plurality of rotation shafts by the reinforcing member that is coupled to the bracket.

The bracket may further include an elastic member support groove may be configured to support one end of the elastic member.

The elastic member may have the one end supported by the elastic member support groove and another end supported by the door bracket.

The handle lever, the slider, and the pusher may be disposed to have centers located on a same line.

The slider and the pusher may be provided as a pair on both left and right sides of a central portion of the door bracket, and a pressing portion formed on the handle lever to press the slider during rotation of the handle lever may be provided as a pair to correspond to the pair of sliders.

According to an aspect of the disclosure, there is provided a door opening device for opening a drawer-type door slidably coupled to an inside of a main body, wherein the drawer-type door includes: a door cap coupled to an upper portion of the drawer-type door, and including a handle pocket recessed downward from a surface of the door cap; and a door bracket coupled to a lower end of the door cap, and coupled to the door opening device, wherein the door opening device includes: a handle lever rotatably coupled to the door bracket; a slider disposed at a rear of the handle lever to perform straight linear motion in an upper-to-lower direction by the handle lever; and a pusher coupled at a rear of the slider, and configured to perform straight linear motion by the slider to push the main body so as to open the drawer-type door, wherein the slider is configured to move in an upper-to-lower direction such that a range of rotation of the handle lever increases to increase a moving distance of the pusher.

The handle lever may include a gripping portion exposed to the handle pocket, a pressing portion configured to press the slider when the handle lever is rotated, and a plurality of rotation shafts rotatably coupled to the door bracket.

The slider may include: a guide protrusion configured to guide the slider for movement along a first guide rail, a sliding surface obliquely formed such that the pressing portion slidably moves while in contact with the sliding surface, a first inclined surface obliquely formed to contact the pusher, and a separation preventing protrusion configured to prevent separation of the handle lever coupled to the door bracket.

The pusher may include: a second inclined surface formed to correspond to the first inclined surface and configured to, while the slider is moving upward, slide along the first inclined surface such that the pusher moves rearward; and a push portion configured to push the main body.

The door opening device may further include an elastic member coupled to one of the plurality of rotation shafts, and having one end supported by the handle lever and another end supported by the door bracket such that the handle lever subjected to the rotation may return to an original position in response to a force applied to the handle lever being removed.

Before undertaking the DETAILED DESCRIPTION below, it may be advantageous to set forth definitions of certain words and phrases used throughout this patent document: the terms “include” and “comprise,” as well as derivatives thereof, mean inclusion without limitation; the term “or,” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms “application” and “program” refer to one or more computer programs, software components, sets of instructions, procedures, functions, objects, classes, instances, related data, or a portion thereof adapted for implementation in a suitable computer readable program code. The phrase “computer readable program code” includes any type of computer code, including source code, object code, and executable code. The phrase “computer readable medium” includes any type of medium capable of being accessed by a computer, such as read only memory (ROM), random access memory (RAM), a hard disk drive, a compact disc (CD), a digital video disc (DVD), or any other type of memory. A “non-transitory” computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
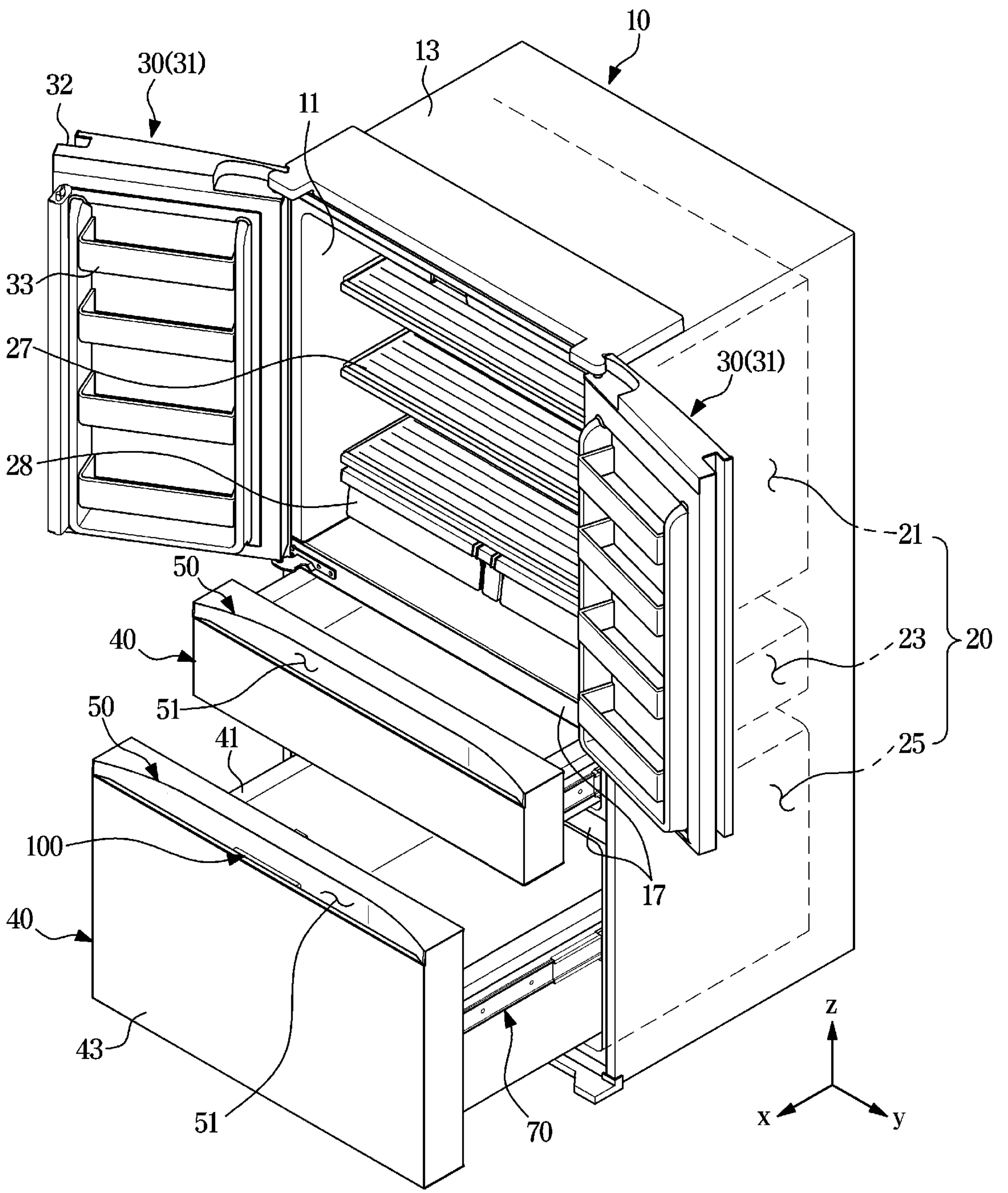
FIG. 1 is a perspective view illustrating a refrigerator according to various embodiments of the present disclosure.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the specification and configurations shown in the accompanying drawings may be merely examples of the present disclosure, and various modifications may replace the embodiments and the drawings of the present disclosure at the time of filing of the present application.

Further, identical symbols or numbers in the drawings of the present disclosure denote components or elements configured to perform substantially identical functions.

Further, terms used herein may be only for the purpose of describing particular embodiments and may be not intended to limit and/or restrict the present disclosure. The singular form may be intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements may be not limited by the terms, and the terms may be only used to distinguish one element from another. For example, a first element could be termed a second element, and similarly, a second element could be termed a first element without departing from the scope of the present disclosure. The term "and/or" includes combinations of one or all of a plurality of associated listed items.

Meanwhile, the terms "front", "rear", "upper", "lower", "front", "rear", "top" and "bottom" used in the following description may be defined based on drawings, and the shape and position of each component may be not limited by the terms.

Hereinafter, embodiments according to the disclosure will be described in detail with reference to the accompanying drawings.

FIG. 1 is a perspective view illustrating a refrigerator according to various embodiments of the present disclosure.

Referring to FIG. 1, a refrigerator includes a main body 10, a plurality of storage compartments 20 provided inside the main body 10 with a front that is open, and a door 30 for closing and opening the open front.

The main body 10 may include an inner case 11 forming the storage compartment 20 and an outer case 13 forming the external appearance. A heat insulating material 15 may be foamed between the inner case 11 and the outer case 13 and inside the door 30 to prevent leakage of cold air from the storage compartment 20 (see FIG. 15).

The main body 10 may include a cold air supply device for supplying cold air to the storage compartment 20. The cold air supply device includes a compressor (not shown), a condenser (not shown), an expansion valve (not shown), an evaporator (not shown), a blowing fan (not shown), a cold air duct (not shown), and the like.

A machine room is provided at a rear lower side of the main body 10. A compressor and a condenser for compressing a refrigerant and condensing the compressed refrigerant can be installed in the machine room.

An evaporator that generates cold air, a blowing fan that guides the cold air generated by the evaporator into the storage compartment 20, and a cold air duct that guides the cold air generated by the evaporator to the storage compartment 20 may be disposed on a rear wall of the storage compartment 20. Each of the evaporator, the blowing fan, and the cold air duct may be provided in plural to independently supply cold air to the storage compartment 20.

The storage compartment 20 may be partitioned into a plurality of spaces by a partition wall 17. The storage compartment 20 may be divided into an upper compartment 21, a middle compartment 23, and a lower compartment 25 in the order from the upper to lower side by the partition wall 17. The upper compartment 21, the middle compartment 23, and the lower compartment 25 may each store refrigerated or frozen food as needed.

The upper compartment 21 may be provided with a plurality of shelves 27 to partition the upper compartment 21 into a plurality of spaces. A plurality of storage containers 28 for storing food or the like may be provided in the upper compartment 21.

The door 30 may include double doors 31 that are rotatably coupled to the main body 10 and open and close the upper compartment 21. The double-doors 31 may include a recessed handle 32 that can be gripped by a user to open and close the double-doors 31. A plurality of door guards 33 for storing food and the like may be installed on a rear surface of the double-doors 31.

The door 30 may include drawer-type doors 40 provided to be slidably movable with respect to the main body 10 and opening and closing the middle compartment 23 and the lower compartment 25, respectively. The drawer-type door 40 may include a handle pocket 51, which is a recess type handle, to be gripped by a user when opening and closing the drawer-type door 40. The drawer-type door 40 may include a storage box 41 in which food or the like is stored.

The middle compartment 23 and the lower compartment 25 opened and closed by the drawer-type doors 40 may be provided to have different capacities. On the drawing, the capacity of the lower compartment 25 is illustrated as larger than that of the middle compartment 23, but it is not limited thereto. Among the drawer-type doors 40 that open and close the middle compartment 23 and the lower compartment 25, the drawer-type door 40 that opens and closes the lower compartment 25 having a large capacity may be provided with a door opening device 100 for opening the drawer-type door 40, which may be because opening the drawer-type door 40 in opening and closing the lower compartment 25 having a larger capacity compared to the middle compartment 23 having a smaller capacity requires a great force. Although the door opening device 100 is illustrated as being provided only in the drawer-type door 40 that opens and closes the lower compartment 25, it is not limited thereto. That is, the door opening device 100 may also be provided in the drawer-type door 40 that opens and closes the middle compartment 23. The configuration in which the door opening device 100 is provided in the drawer-type door 40 will be described below.

The drawer-type door 40 may be inserted into and withdrawn from the middle compartment 23 and the lower compartment 25 in a sliding manner by a sliding device 70. One sides of the sliding devices 70 for slidably moving the drawer-type door 40 may be coupled to both sidewalls inside of the middle compartment 23 or the lower compartment 25, in which the drawer-type door 40 is accommodated, respectively, and the other sides of the sliding devices 70 may be coupled to both side surfaces of the drawer-type door 40, respectively.

Figure 2:
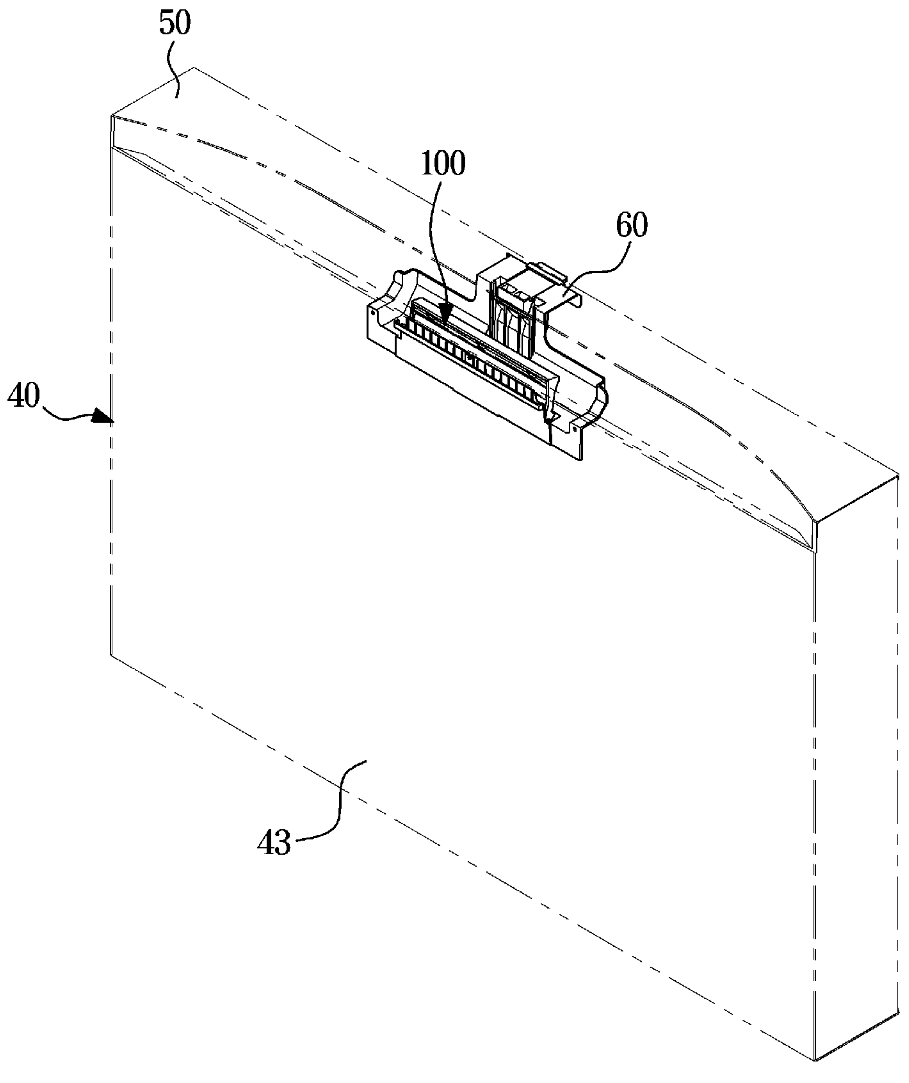
FIG. 2 is a view illustrating a state in which a door opening device is provided in a drawer-type door according to various embodiments of the present disclosure.
Figure 3:
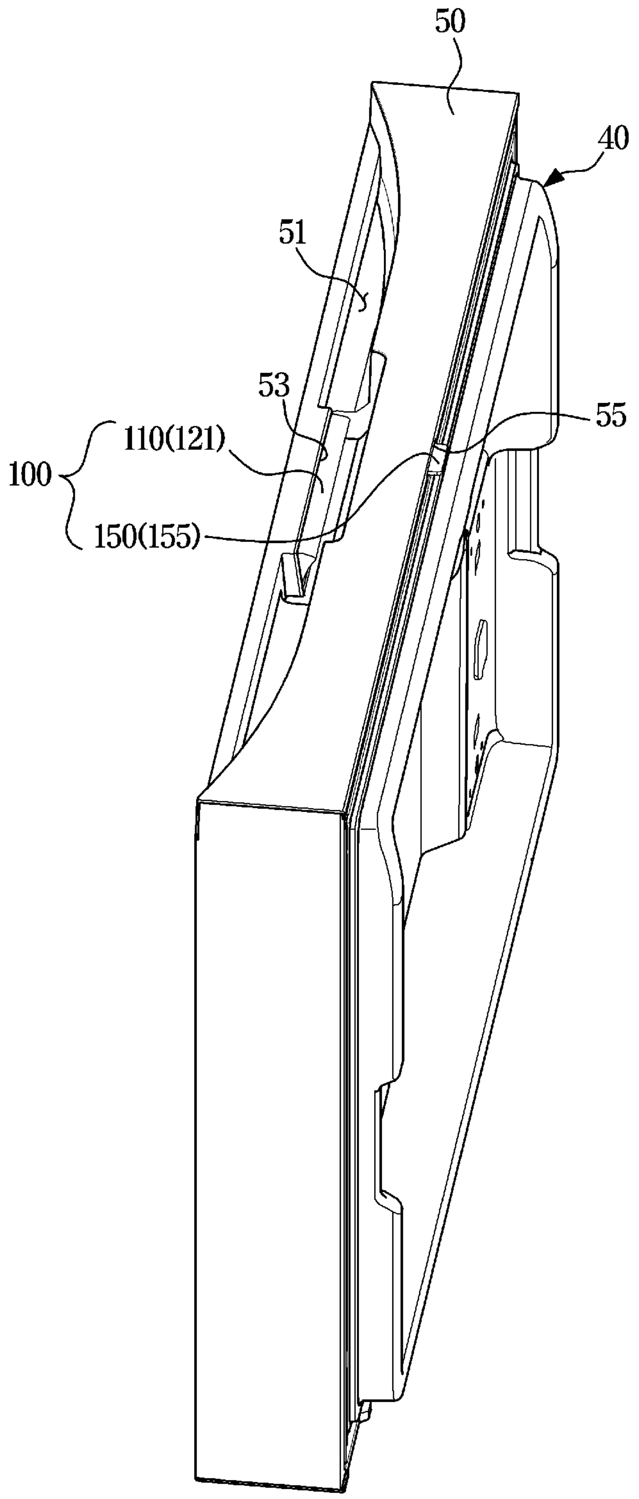
FIG. 3 is a view illustrating a state of a drawer-type door according to various embodiments of the present disclosure, which is viewed from the top.
Figure 4:
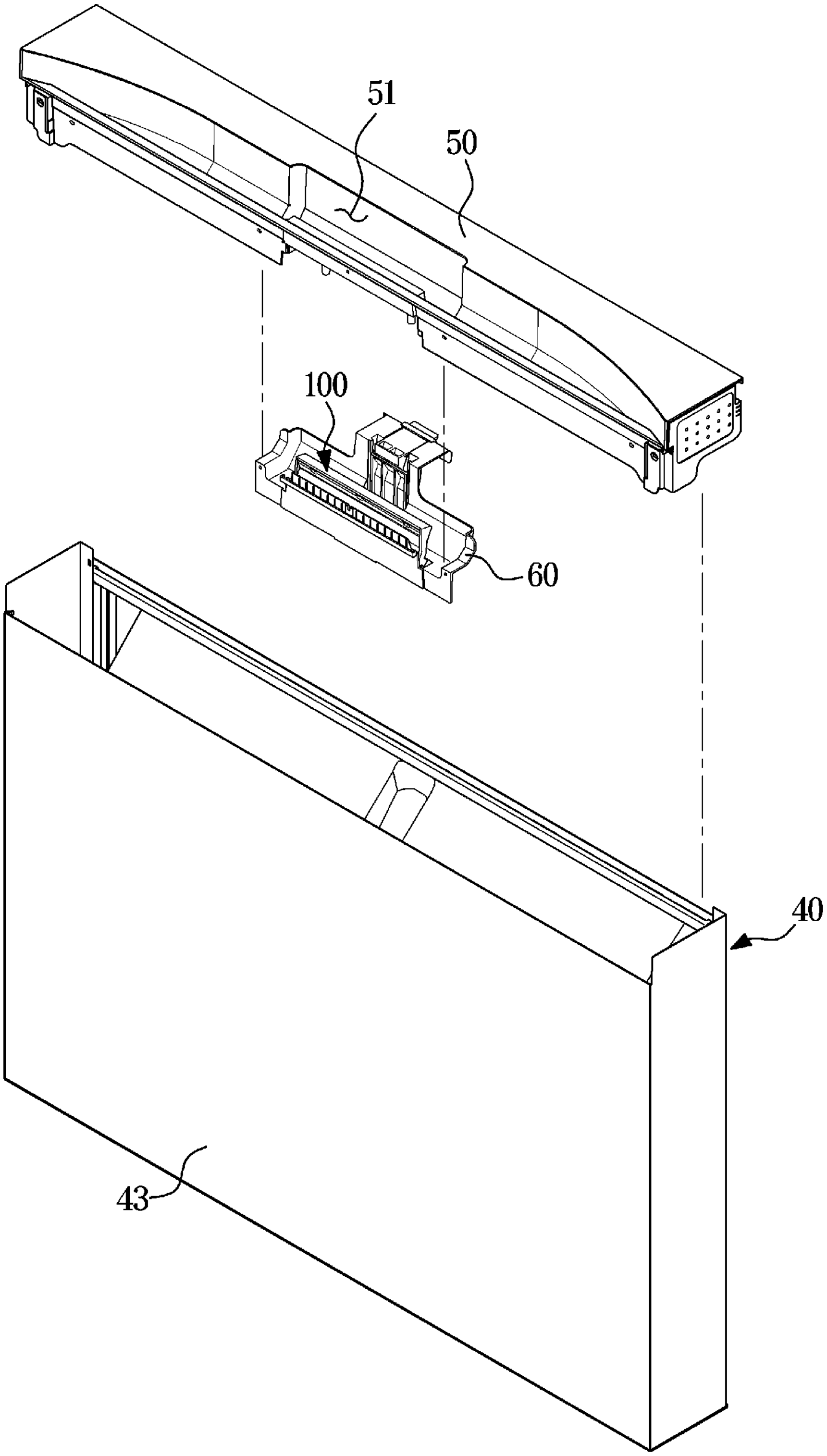
FIG. 4 is a view illustrating a state in which a door cap is assembled to an upper portion of a drawer-type door and a door opening device is assembled to a lower portion of the door cap according to various embodiments of the present disclosure.

FIG. 2 is a view illustrating a state in which a door opening device is provided in a drawer-type door according to various embodiments of the present disclosure. FIG. 3 is a view illustrating a state of a drawer-type door according to various embodiments of the present disclosure, viewed from the top. FIG. 4 is a view illustrating a state in which a door cap is assembled to an upper portion of a drawer-type door and a door opening device is assembled to a lower portion of the door cap according to various embodiments of the present disclosure.

Referring to FIGS. 2 to 4, the drawer-type door 40 may be provided with the door opening device 100. The drawer-type door 40 may include a door cap 50 assembled to an upper portion of the drawer-type door 40. The door cap 50 may include a handle pocket 51, which is a recessed handle. The handle pocket 51 may be formed in a shape recessed downward to be gripped by a user when opening the drawer-type door 40. The door opening device 100 may be assembled to the lower portion of the door cap 50. The door opening device 100 may be assembled to the lower portion of the handle pocket 51. The door opening device 100 may be assembled to the lower portion of the handle pocket 51 to be prevented from being exposed to the outside. Since exposure of the door opening device 100 is prevented, the drawer-type door 40 for opening and closing the lower compartment 25 may have the same appearance as that of the drawer-type door 40 for opening and closing the middle compartment 23, in which the door opening device 100 is not provided, when viewed from the front of the refrigerator. Such a configuration provides a sense of uniformity to the drawer-type door 40 for opening and closing the middle compartment 23 and the drawer-type door 40 for opening and closing the lower compartment 25, thereby improving the external appearance (see FIG. 1).

In the case of a refrigerator having a structure that allows for replacement of a front panel 43 of the drawer-type door 40, the insulation thickness of the drawer-type door 40 may be reduced due to a structure for assembling the front panel 43. That is, the upper portion of the drawer-type door 40 is inevitably caused to have a small insulation thickness due to the handle pocket 51, and the insulation thickness may be further reduced due to the structure for assembling the front panel 43. Therefore, in order to minimally reduce the insulation thickness of the drawer-type door 40, the width of the handle pocket 51 in the front-rear direction may be reduced by providing the door opening device 100 with a minimum volume. That is, there is a need to provide the door opening device 100 with a minimum volume while ensuring efficient operation, which will be described in detail below.

The door cap 50 may include a first opening portion 53 that is open such that a portion of a handle lever 110 to be described below is exposed to the handle pocket 51. The first opening portion 53 may be formed in a front portion of a wall forming the handle pocket 51. A user may grip the handle pocket 51 and press a portion of the handle lever 110 exposed through the first opening portion 53. The portion of the handle lever 110 exposed through the first opening portion 53 may be a gripping portion 121.

The door cap 50 may include a second opening portion 55 formed at a position corresponding to an opening 65*b* of a door bracket 60 to be described below. A portion 155 of a pusher 150 to be described below may be exposed to the outside of the drawer-type door 40 through the second opening portion 55. The pusher 150 exposed to the outside of the drawer-type door 40 through the second opening portion 55 may be moved by the handle lever 110 rearward, that is, toward the main body (10 in FIG. 1), thereby pressing the main body 10. The second opening portion 55 will be described in detail when the door bracket 60 is described.

The door opening device 100 may be assembled to the door bracket 60. The door bracket 60 may be assembled to a central portion of the lower end of the door cap 50. That is, the door opening device 100 may be assembled to the door bracket 60 and assembled to the central portion of the lower end of the door cap 50. The door opening device 100 may be assembled to the lower end of the door cap 50 and may be prevented from being exposed to the outside. In the door opening device 100, only the gripping portion 121, which is a portion of the handle lever 110, may be exposed to the outside through the first opening portion 53, and the remaining portion may be prevented from being exposed to the outside.

Figure 5:
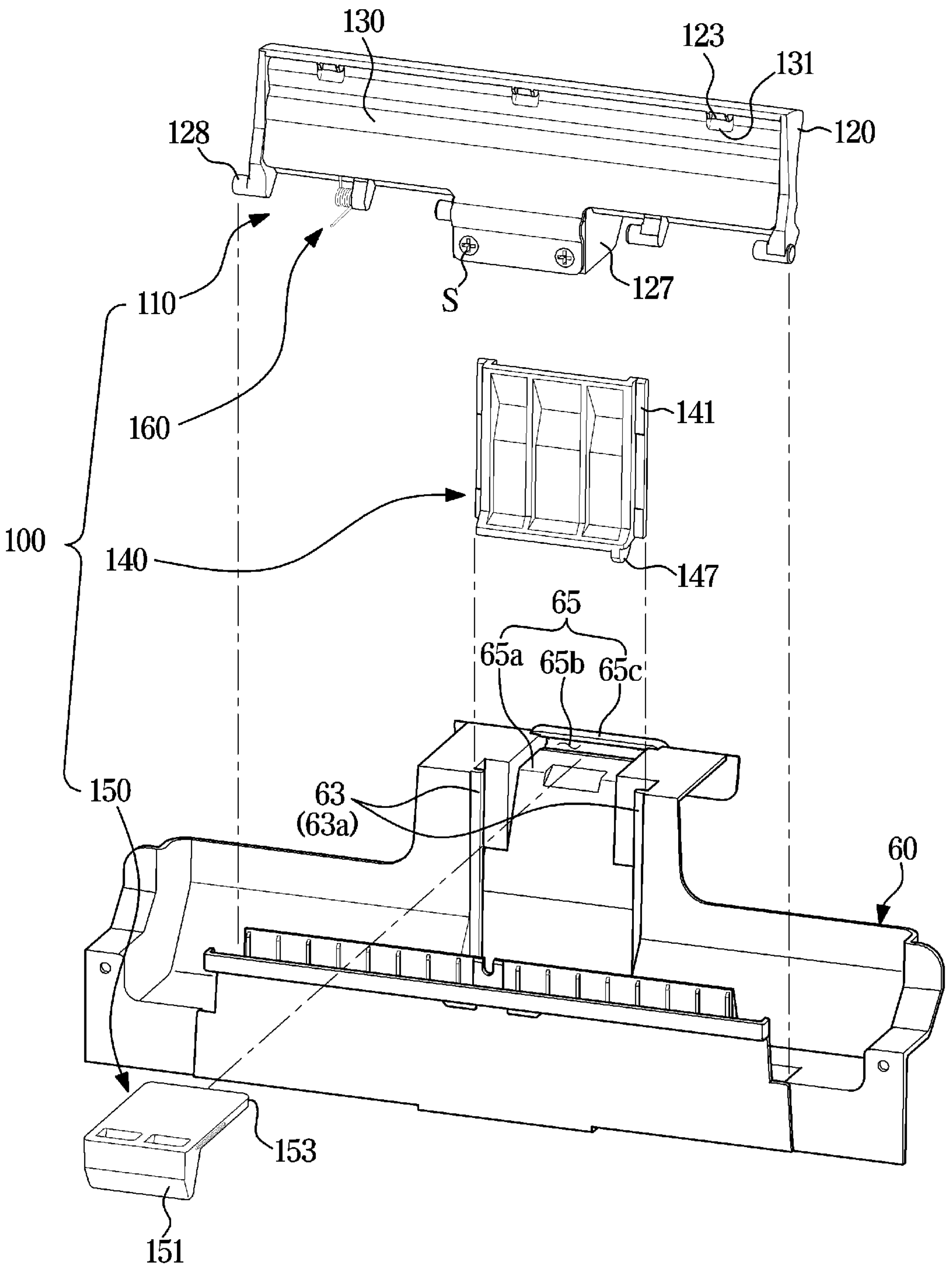
FIG. 5 is a view illustrating a state in which a door opening device is assembled to a door bracket according to various embodiments of the present disclosure.
Figure 6:
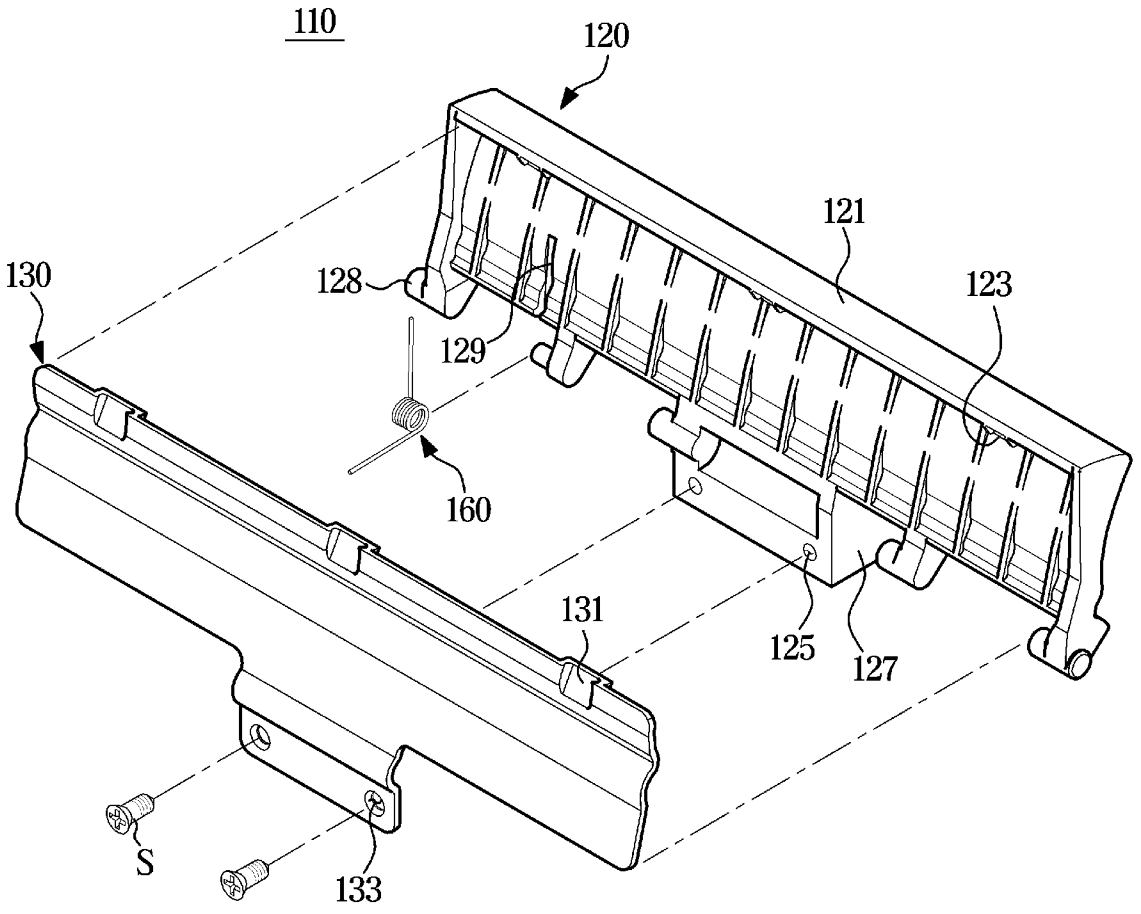
FIG. 6 is an exploded perspective view of a handle lever according to various embodiments of the present disclosure.

FIG. 5 is a view illustrating a state in which a door opening device according to various embodiments of the present disclosure is assembled to a door bracket. FIG. 6 is an exploded perspective view of a handle lever according to various embodiments of the present disclosure;

Referring to FIGS. 5 and 6, the door opening device 100 may be assembled to the door bracket 60. The door opening device 100 may include the handle lever 110 rotatably assembled to the door bracket 60. The handle lever 110 may be rotated according to pressing by a user while gripping the handle pocket 51. The handle lever 110 may be rotated to move a slider 140 to be described below.

The door bracket 60 may include a handle lever assembly portion 61 to which the handle lever 110 is assembled. The handle lever 110 may be rotatably assembled to the handle lever assembly portion 61 of the door bracket 60. The handle lever assembly portion 61 may include a recessed portion 61*a* formed by being depressed to accommodate a portion of the handle lever 110. The handle lever assembly portion 61 may include a plurality of rotation holes 61*b* to which a plurality of rotation shafts 128 formed on the handle lever 110 are rotatably secured (see FIG. 9).

The door bracket 60 may include a slider assembly portion 63 to which the slider 140 is assembled. The slider 140 may be assembled to the slider assembly portion 63 of the door bracket 60 to perform straight linear motion. The slider 140 may be assembled to the slider assembly portion 63 to perform vertical straight linear motion in the upper-lower direction line. The slider assembly portion 63 may include a first guide rail 63*a* that guides the slider 140 to perform straight linear motion in the upper-lower direction. The slider 140 may perform vertical linear motion in an upper-lower direction as a guide protrusion 141 moves along the first guide rail 63*a*.

The door bracket 60 may include a pusher assembly portion 65 to which the pusher 150 is assembled. The pusher 150 may be assembled to the pusher assembly portion 65 of the door bracket 60 to perform straight linear motion. The pusher 150 may be assembled to the pusher assembly portion 65 to perform straight linear motion in the front-rear direction.

The pusher assembly portion 65 may include a second guide rail 65*a* for guiding the pusher 150 to perform straight linear motion in the front-rear direction. The pusher assembly portion 65 may include the opening 65*b* that is open such that the pusher 150 performs straight linear motion backward to press the main body (10 in FIG. 1). The pusher assembly portion 65 may include a separation preventing bar 65*c* forming the opening 65*b*. The separation preventing bar 65*c* may be formed on an upper side of the second guide rail 65*a* to form the opening 65*b* between the second guide rail 65*a* and the separation preventing bar 65*c*. The pusher 150 moving along the second guide rail 65*a* may be prevented from separating from the second guide rail 65*a* by the separation preventing bar 65*c*.

The handle lever 110 may include a bracket 120. The bracket 120 may include the gripping portion 121 exposed to the handle pocket 51 through the first opening portion 53 formed in the door cap 50. The gripping portion 121 may be exposed to the outside through the handle pocket 51 to be pressed by a user while gripping the handle pocket 51. When the user presses the gripping portion 121, the handle lever 110 may be rotated (see FIG. 3).

The bracket 120 may include a plurality of catching hooks 123 to which a reinforcing member 130 is assembled. The plurality of catching hooks 123 may be formed on an upper portion of the bracket 120. The plurality of catching hooks 123 may be caught and fixed to a plurality of catching grooves 131 of the reinforcing member 130 to be described below.

The bracket 120 may include a first fastening hole 125 through which the reinforcing member 130 subjected to the assembly is fastened by a fastening member S. The first fastening hole 125 may be formed at a position corresponding to a second fastening hole 133 formed in the reinforcing member 130. As the fastening member S is fastened to the second fastening hole 133 of the reinforcing member 130 and the first fastening hole 125 of the bracket 120, the reinforcing member 130 may be fastened to the bracket 120.

The bracket 120 may include a pressing portion 127 that presses the slider 140. The pressing portion 127 may come into contact with a sliding surface 143 of the slider 140 to be described below. When the handle lever 110 is rotated, the pressing portion 127 slides along the sliding surface 143 to move the slider 140 (see FIG. 15).

The bracket 120 may include a plurality of rotation shafts 128 rotatably assembled to the door bracket 60. The plurality of rotation shafts 128 may be integrally formed with the bracket 120. Since the handle lever 110 is assembled to the door bracket 60 by only inserting the plurality of rotation shafts 128 integrally formed with the bracket 120 into the plurality of rotation holes 61*b* formed in the door bracket 60, assembly of the door opening device 100 may be facilitated. In addition, with a structure in which the plurality of rotation shafts 128 are assembled into the plurality of rotation holes 61*b*, rigidity and durability of assembly may be improved. An elastic member 160 may be assembled to one of the plurality of rotation shafts 128. Details of the elastic member 160 will be described below.

The bracket 120 may include an elastic member support groove 129 in which one end of the elastic member 160 is supported. One end of the elastic member 160 assembled to one of the plurality of rotation shafts 128 may be supported in the elastic member support groove 129. That is, the elastic member 160 may be assembled to the rotation shaft 128 adjacent to the elastic member support groove 129.

The handle lever 110 may include the reinforcing member 130. The reinforcing member 130 may be fastened to the bracket 120 to reinforce the rigidity of the bracket 120. The reinforcing member 130 may be formed of a metal material. The reinforcing member 130 may include the plurality of catching grooves 131 to which the plurality of catching hooks 123 of the bracket 120 are assembled. The reinforcing member 130 may include the second fastening hole 133 fastened to the bracket 120 by the fastening member S. The second fastening hole 133 may be formed at a position corresponding to the first fastening hole 125 formed in the bracket 120. As the fastening member S is fastened to the second fastening hole 133 of the reinforcing member 130 and the first fastening hole 125 of the bracket 120, the reinforcing member 130 may be fastened to the bracket 120. The reinforcing member 130 is provided to reinforce the rigidity of the handle lever 110, and when the handle lever 110 itself is formed of metal or engineering plastic, the reinforcing member 130 may not be used.

The door opening device 100 may include the slider 140 assembled to the door bracket 60 to perform straight linear motion. The slider 140 may be disposed between the handle lever 110 and the pusher 150. The slider 140 may be disposed at the rear of the handle lever 110. The slider 140 may be caused to perform straight linear motion in an upper-lower direction by the handle lever 110. That is, when the handle lever 110 is rotated, the slider 140 may be caused to perform straight linear motion in the upper-lower direction by the handle lever 110, and when the slider 140 performs straight linear motion in the upper-lower direction, the pusher 150 may be caused to perform straight linear motion by the slider 140, pushing the main body (10 in FIG. 1).

The slider 140 may include the guide protrusion 141 that guides the slider 140 to move along the first guide rail 63*a* formed on the door bracket 60. The guide protrusion 141 may be formed on both sides of the slider 140. The slider 140 may perform straight linear motion in the upper-lower direction as the guide protrusions 141 move along the first guide rail 63*a*.

The slider 140 may include the sliding surface 143 that may be in contact with the handle lever 110. The sliding surface 143 may be a contact surface that may be in contact with the pressing portion 127 of the handle lever 110. The sliding surface 143 may be provided at a lower end of the slider 140. The sliding surface 143 may be obliquely formed such that the pressing portion 127 is slidably moved. When the handle lever 110 is rotated, the pressing portion 127 may be slidably moved along the sliding surface 143 to cause the slider 140 to move upward (see FIG. 15).

The slider 140 may include a first inclined surface 145 that may be in contact with the pusher 150. The first inclined surface 145 may be a contact surface that may be in contact with the pusher 150. The first inclined surface 145 may be provided at an upper end of the slider 140. The first inclined surface 145 may be obliquely formed such that the pusher 150 is slidably moved along the first inclined surface 145. When the slider 140 performs straight linear motion upward by the handle lever 110, the pusher 150 may be moved along the first inclined surface 145 while performing straight linear motion backward (see FIG. 15).

The slider 140 may include a separation preventing protrusion 147 for preventing the handle lever 110 assembled to the door bracket 60 from being separated. The separation preventing protrusion 147 may be provided on one side of the lower end of the slider 140. The separation preventing protrusion 147 may prevent the handle lever 110 assembled to the handle lever assembly portion 61 of the door bracket 60 from separating in a direction opposite to a direction in which the handle lever 110 is assembled.

The door opening device 100 may include the pusher 150 assembled to the door bracket 60 to perform straight linear motion. When the user presses and rotates the handle lever 110, the slider 140 performs straight linear motion upward by the handle lever 110, and the slider 140 moving upward may cause the pusher 150 to move backward, thereby pushing the main body 10. When the pusher 150 pushes the main body 10, the drawer-type door 40 may be opened (see FIG. 1)

The pusher 150 may include a second inclined surface 151 that may be in contact with the slider 140. The second inclined surface 151 may be provided on a front end of the pusher 150. The second inclined surface 151 may be a contact surface that may be in contact with the slider 140. The second inclined surface 151 may be in contact with the first inclined surface 145 of the slider 140. The second inclined surface 151 may be obliquely formed to correspond to the first inclined surface 145. When the slider 140 performs straight linear motion upward by the handle lever 110, the pusher 150 may perform straight linear motion rearward as the second inclined surface 151 slides along the first inclined surface 145. That is, the pusher 150 may perform straight linear motion in a direction toward the main body 10 (see FIG. 15).

The pusher 150 may include a push portion 153 that performs straight linear motion rearward to push the main body 10. The push portion 153 may be provided at a rear end of the pusher 150. When the pusher 150 performs straight linear motion backward through the opening 65*b* formed in the door bracket 60 by the slider 140, the pusher 150 may push the main body 10. The opening 65*b* may be provided at a position corresponding to the second opening portion 55 of the door cap 50. Accordingly, the pusher 150 may push the main body 10 through the opening 65*b* of the door bracket 60 and the second opening portion 55 of the door cap 50 (see FIGS. 3 and 15).

The door opening device 100 may include an elastic member 160 having one end supported by the handle lever 110 and the other end supported by the door bracket 60. The elastic member 160 may be provided as a torsion spring. Although the elastic member 160 is illustrated as being provided as a torsion spring on the drawings, it is not limited thereto. That is, the elastic member 160 may be provided as a coil spring. The elastic member 160 may be assembled to one of the plurality of rotation shafts 128 formed in the bracket 120 of the handle lever 110. One end of the elastic member 160 assembled to one of the plurality of rotation shafts 128 may be supported on the elastic member support groove 129 formed in the bracket 120. That is, the elastic member 160 may be disposed between the handle lever 110 and the door bracket 60. When the handle lever 110 is rotated with a user pressing the handle lever 110, the handle lever 110 may compress the elastic member 160. When the force applied to the handle lever 110 with compression of the elastic member 160 is removed, the handle lever 110 may be rotated in a direction opposite to the force applied to the handle lever 110 by the compressive force of the elastic member 160. That is, the handle lever 110 may be rotated to return to its original position before a force is applied to the handle lever 110.

In the case of a refrigerator having a structure that allows for replacement of the front panel 43 of the drawer-type door 40 to be replaced, the insulation thickness of the drawer-type door 40 may be reduced due to a structure for assembling the front panel 43. That is, the upper portion of the drawer-type door 40 is inevitably caused to have a small insulation thickness due to the handle pocket 51, and the insulation thickness may be further reduced by the structure for assembling the front panel 43. As described above, when the slider 140 for transferring the rotational force of the handle lever 110 to the pusher 150 in the door opening device 100 is configured to perform straight linear motion in the upper-lower direction, the door opening device 100 may be provided with a reduced volume in the front-rear direction. That is, when the length of the door opening device 100 in the front-rear direction is reduced, the space including the door opening device 100 may be reduced accordingly. Accordingly, the width of the handle pocket 51 in the front-rear direction may be shortened, and the insulation thickness of the drawer-type door 40 may be minimally reduced.

In addition, as described above, when the slider 140 for transferring the rotational force of the handle lever 110 to the pusher 150 in the door opening device 100 is configured to perform straight linear motion in the upper-lower direction, the space occupied by the slider 140 is reduced, which may provide the handle lever 110 with a larger rotation range. When the rotation range of the handle lever 110 increases, the movement distance of the pusher 150 may also increase. Accordingly, the drawer-type door 40 may be opened more easily by the door opening device 100.

Figure 7:
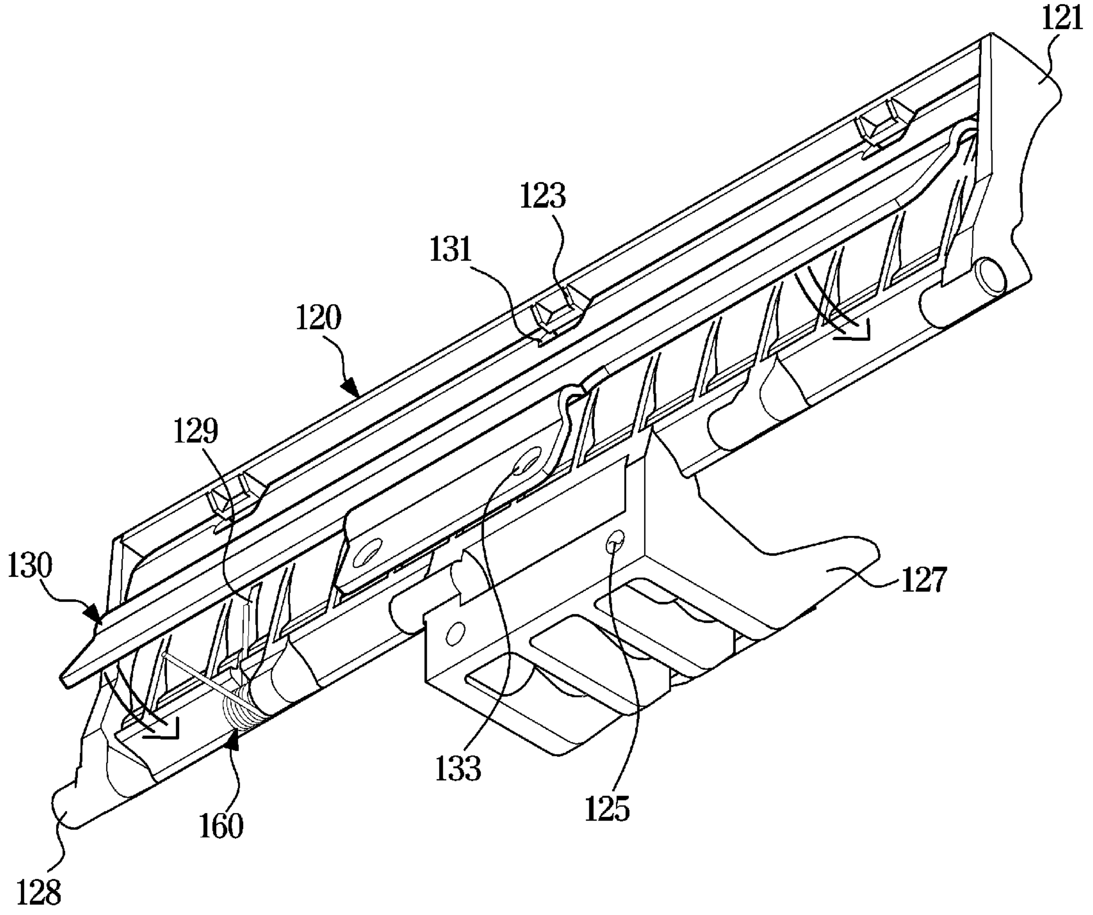
FIG. 7 is a view illustrating a state in which a reinforcing member is assembled to a bracket according to various embodiments of the present disclosure.
Figure 8:
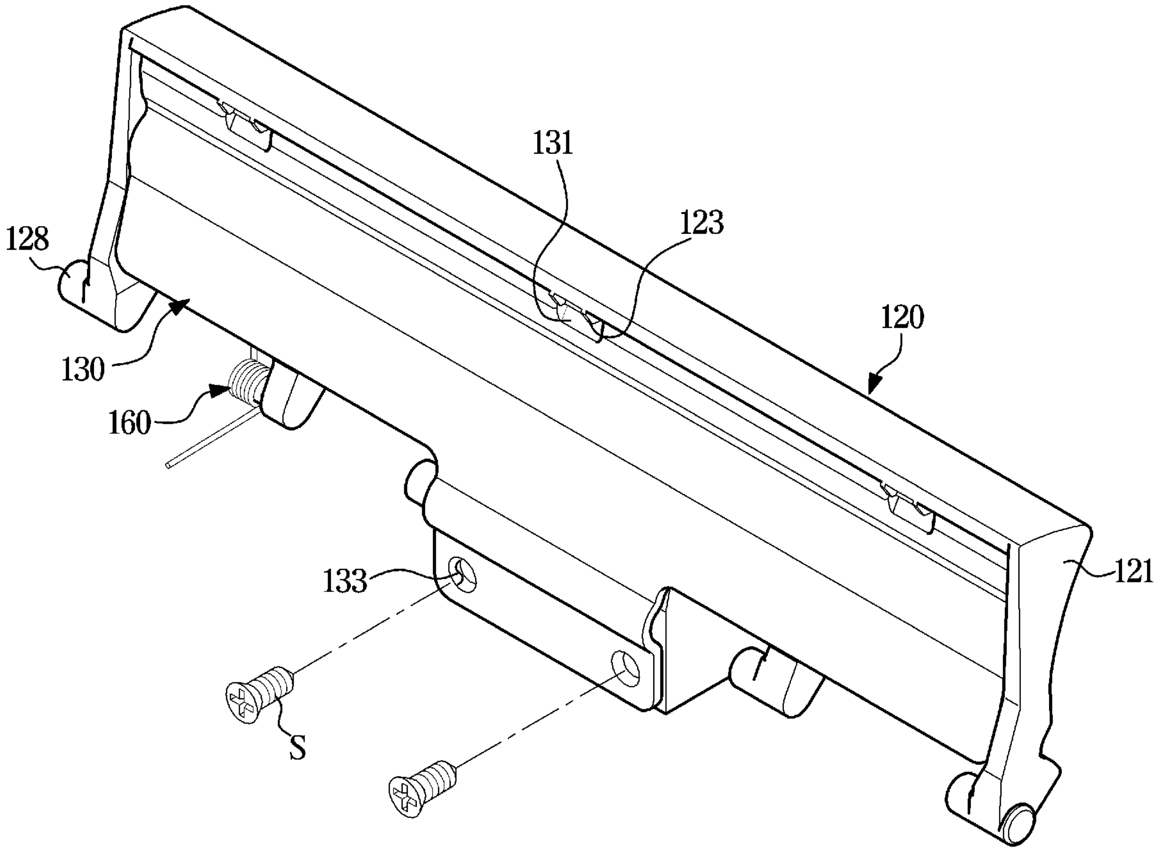
FIG. 8 is a view illustrating a state in which a reinforcing member assembled to a bracket is fastened to the bracket by a fastening member according to various embodiments of the present disclosure.

FIG. 7 is a view illustrating a state in which a reinforcing member is assembled to a bracket according to various embodiments of the present disclosure. FIG. 8 is a view illustrating a state in which a reinforcing member assembled to a bracket is fastened to the bracket by a fastening member according to various embodiments of the present disclosure.

Referring to FIG. 7, the reinforcing member 130 may be assembled to the bracket 120. Before assembling the reinforcing member 130 to the bracket 120, the elastic member 160 may be assembled to one of the plurality of rotation shafts 128 formed on the bracket 120. In order to assemble the reinforcing member 130 to the bracket 120, first, the plurality of catching hooks 123 formed on the bracket 120 may be inserted and fixed into the plurality of catching grooves 131 of the reinforcing member 130. The plurality of catching hooks 123 of the bracket 120 and the plurality of catching grooves 131 of the reinforcing member 130 may be formed on upper portions of the bracket 120 and the reinforcing member 130, respectively. After fixing the plurality of catching hooks 123 to the plurality of catching grooves 131, the reinforcing member 130 may be rotated.

When the reinforcing member 130 is rotated, as shown in FIG. 8, the first fastening hole 125 of the bracket 120 and the second fastening hole 133 of the reinforcing member 130 may coincide with each other. When the first fastening hole 125 of the bracket 120 and the second fastening hole 133 of the reinforcing member 130 coincide with each other, the fastening member S may be fastened to the second fastening hole 133 and the first fastening hole 125 to assemble the reinforcing member 130 to the bracket 120. When the reinforcing member 130 is assembled to the bracket 120, the elastic member 160 may be prevented separating by the reinforcing member 130.

Figure 9:
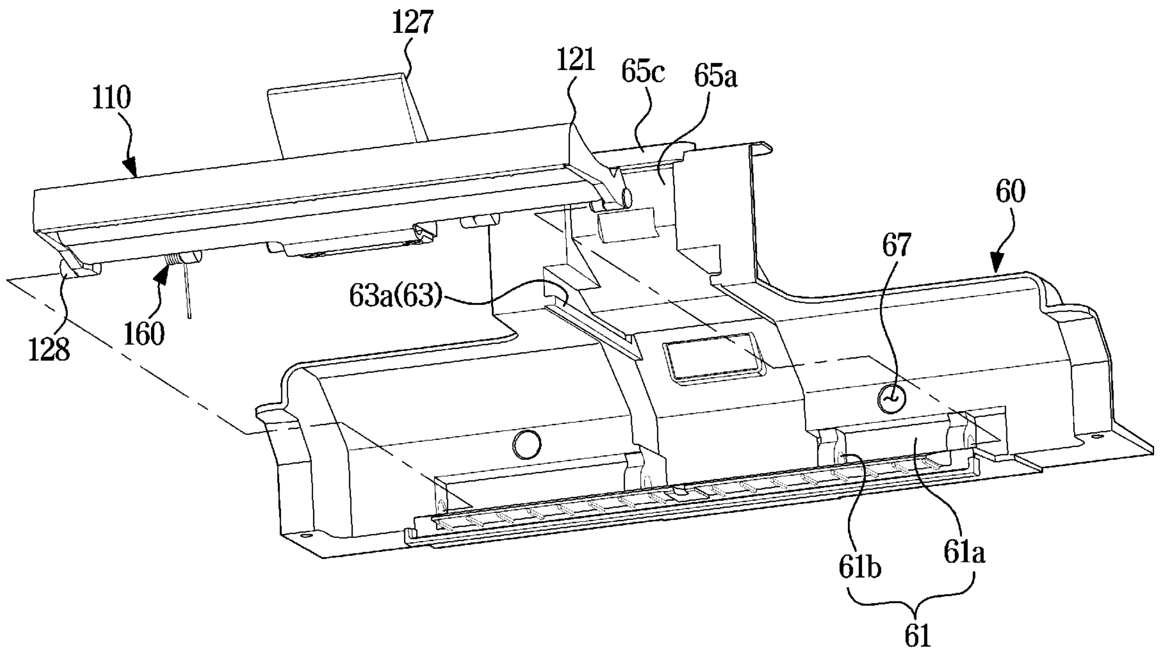
FIG. 9 is a view illustrating a state in which a handle lever is assembled to a door bracket according to various embodiments of the present disclosure.
Figure 10:
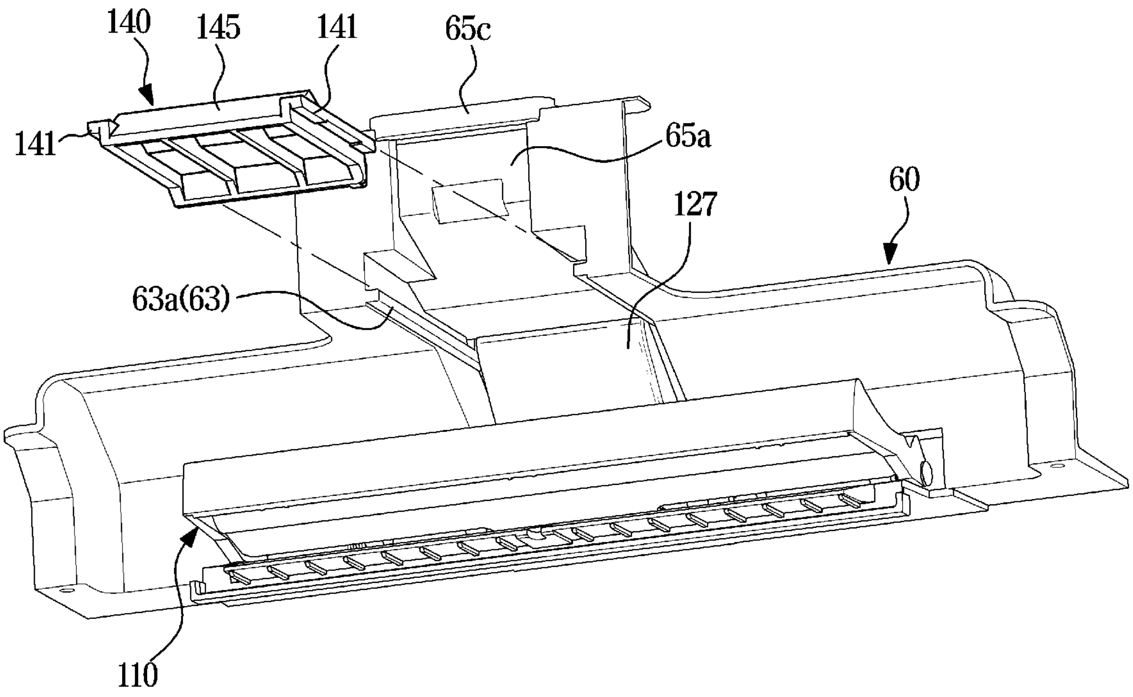
FIG. 10 is a view illustrating a state in which a slider is assembled to a door bracket according to various embodiments of the present disclosure.
Figure 11:
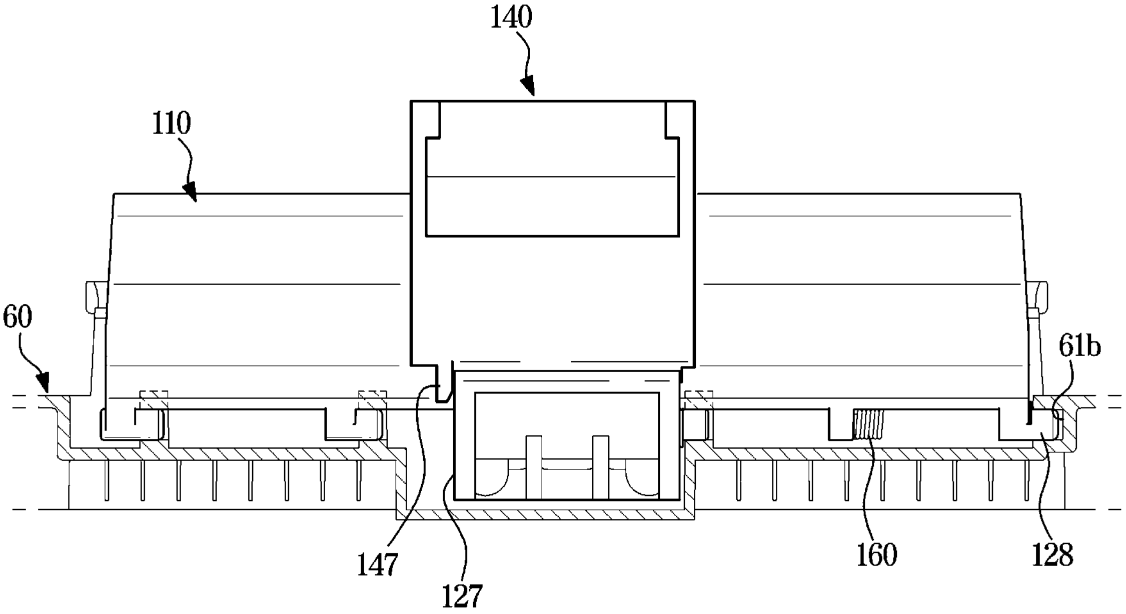
FIG. 11 is a view illustrating a state in which a slider is assembled to a door bracket and a handle lever is prevented from separating by a separation preventing protrusion of the slider according to various embodiments of the present disclosure.
Figure 12:
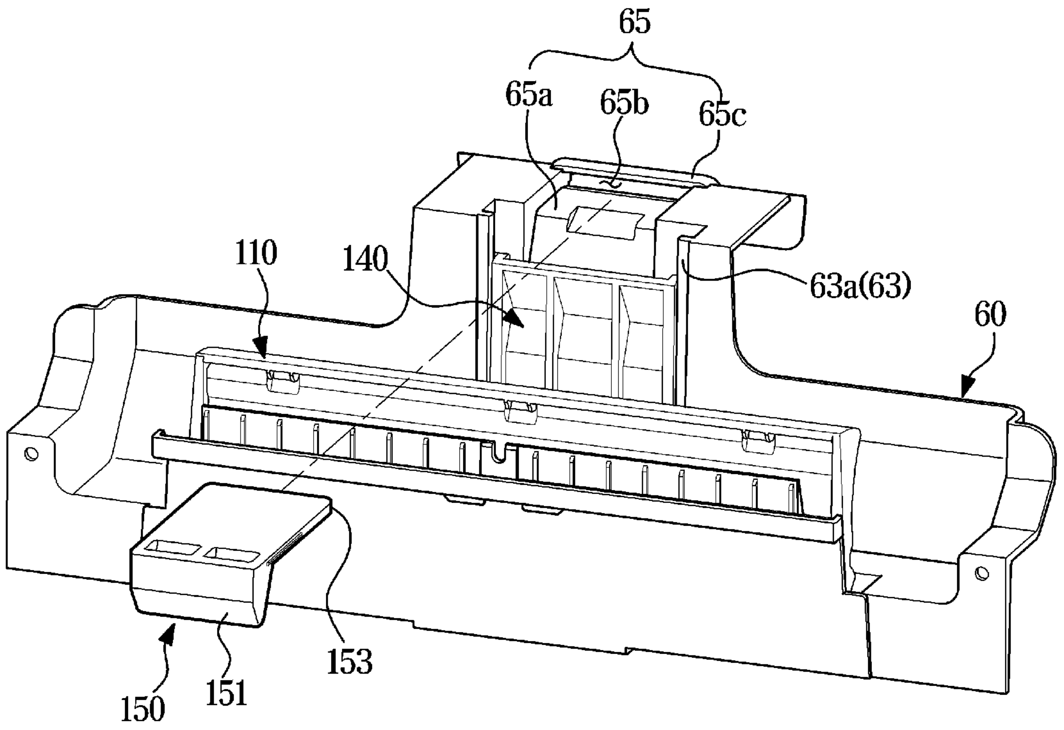
FIG. 12 is a view illustrating a state in which a pusher is assembled to a door bracket according to various embodiments of the present disclosure.

FIG. 9 is a view illustrating a state in which a handle lever is assembled to a door bracket according to various embodiments of the present disclosure. FIG. 10 is a view illustrating a state in which a slider is assembled to a door bracket according to various embodiments of the present disclosure. FIG. 11 is a view illustrating a state in which a slider is assembled to a door bracket and a handle lever is prevented from separating by a separation preventing protrusion of the slider according to various embodiments of the present disclosure. FIG. 12 is a view illustrating a state in which a pusher is assembled to a door bracket according to various embodiments of the present disclosure.

Referring to FIG. 9, the handle lever 110 may be assembled to the door bracket 60. The handle lever 110 may be rotatably assembled to the handle lever assembly portion 61 of the door bracket 60. A portion of the handle lever 110 may be accommodated in the recessed portion 61*a* of the handle lever assembly portion 61. The plurality of rotation shafts 128 formed on the bracket 120 of the handle lever 110 may be rotatably assembled to the plurality of rotation holes 61*b* of the handle lever assembly portion 61.

After the handle lever 110 is assembled to the door bracket 60, as shown in FIG. 10, the slider 140 may be assembled to the door bracket 60. The slider 140 may be assembled to the slider assembly portion 63 of the door bracket 60 to perform straight linear motion in the upper-lower direction. The slider 140 may be assembled to perform straight linear motion in the upper-lower direction as the guide protrusion 141 is guided by the first guide rail 63*a* of the slider assembly portion 63.

When the slider 140 is assembled to the door bracket 60, as shown in FIG. 10, the handle lever 110 may be prevented from separating by the separation preventing protrusion 147 of the slider 140. That is, the separation preventing protrusion 147 may prevent the handle lever 110 from separating in a direction opposite to the direction in which the handle lever 110 is assembled to the door bracket 60.

After the slider 140 is assembled to the door bracket 60, as shown in FIG. 12, the pusher 150 may be assembled to the door bracket 60. The pusher 150 may be assembled to the pusher assembly portion 65 of the door bracket 60 to perform straight linear motion in the front-rear direction. The pusher 150 may be assembled to be movable along the second guide rail 65*a* of the pusher assembly portion 65. The pusher 150 may be assembled to pass through the opening 65*b*.

Figure 13:
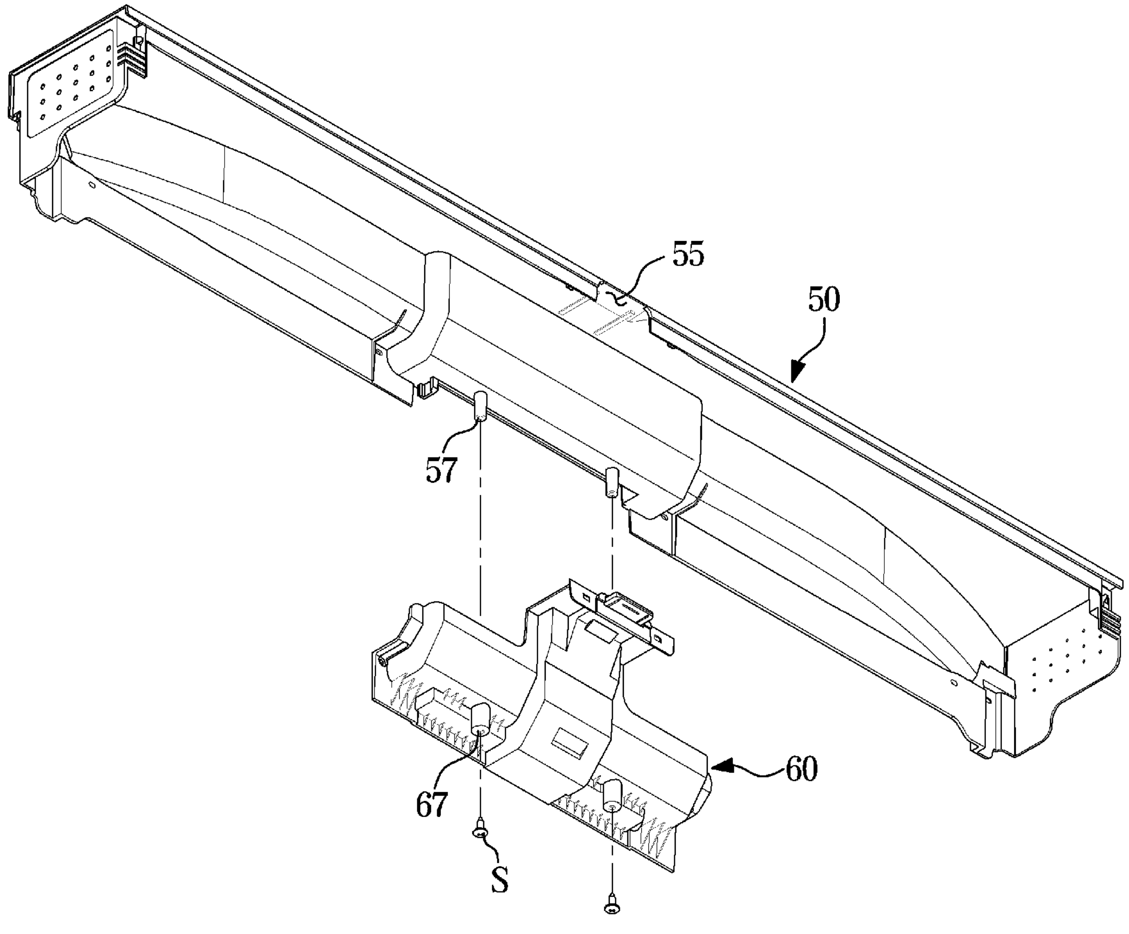
FIG. 13 is a view illustrating a state in which a door bracket to which a door opening device is assembled is assembled to a lower end of a door cap according to various embodiments of the present disclosure.

FIG. 13 is a view illustrating a state in which a door bracket to which a door opening device is assembled according to various embodiments of the present disclosure is assembled to a lower end of a door cap.

Referring to FIG. 13, the door bracket 60 to which the door opening device 100 is assembled may be assembled to the lower end of the door cap 50. The door bracket 60 may be assembled to the central portion of the lower end of the door cap 50. The door bracket 60 may be assembled to the lower end of the handle pocket 51 of the door cap 50. Since the door bracket 60 is assembled to the lower end of the handle pocket 51, the door opening device 100 may be prevented from being exposed to the outside. Since exposure of the door opening device 100 is prevented, the drawer-type door 40 for opening and closing the lower compartment 25 may have the same appearance as that of the drawer-type door 40 for opening and closing the middle compartment 23, in which the door opening device 100 is not provided, when viewed from the front of the refrigerator. Such a configuration provides a sense of uniformity to the drawer-type door 40 for opening and closing the middle compartment 23 and the drawer-type door 40 for opening and closing the lower compartment 25, thereby improving the external appearance (see FIG. 1).

In order for the door bracket 60 to be coupled to the door cap 50, the door bracket 60 may be provided with a first assembly hole 67. The door cap 50 may be provided with a second assembly hole 57 to which the first assembly hole 67 of the door bracket 60 is assembled. The door bracket 60 may be assembled to the door cap 50 by a fastening member S fastened to the first assembly hole 67 and the second assembly hole 57.

Figure 14:
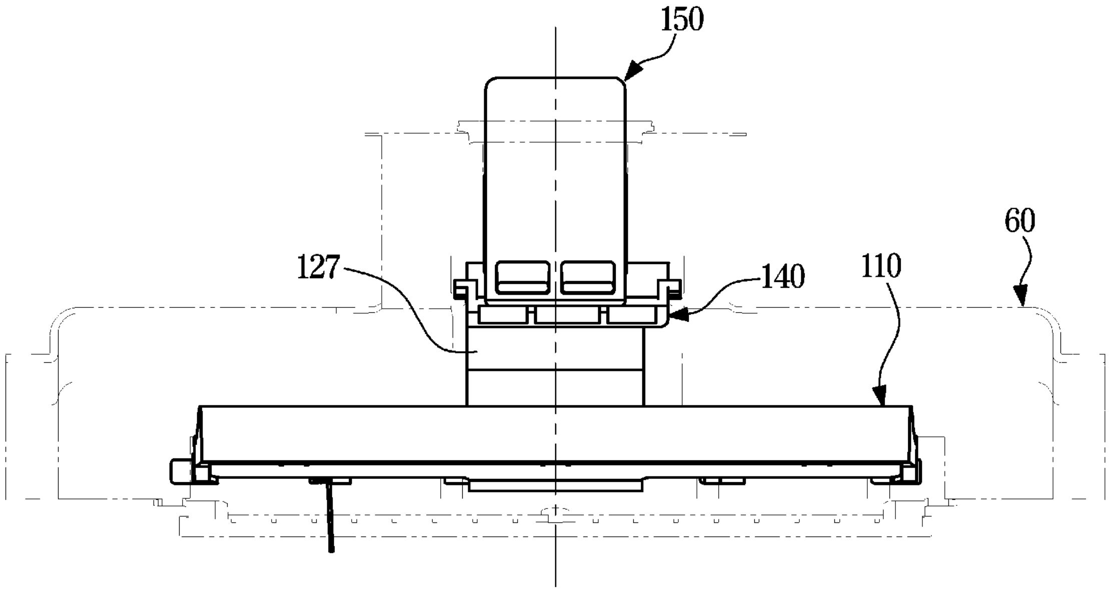
FIG. 14 is a view illustrating a state in which the centers of a handle lever, a slider, and a pusher are located on the same line according to various embodiments of the present disclosure.

FIG. 14 is a view illustrating a state in which the centers of a handle lever, a slider, and a pusher are located on the same line according to various embodiments of the present disclosure.

Referring to FIG. 14, the centers of the handle lever 110, the slider 140, and the pusher 150 may be located on the same line. Since the centers of the handle lever 110, the slider 140, and the pusher 150 are located on the same line, a shortening of the movement distance of the pusher 150 due to bending of the handle lever 110 may be prevented.

Figure 15:
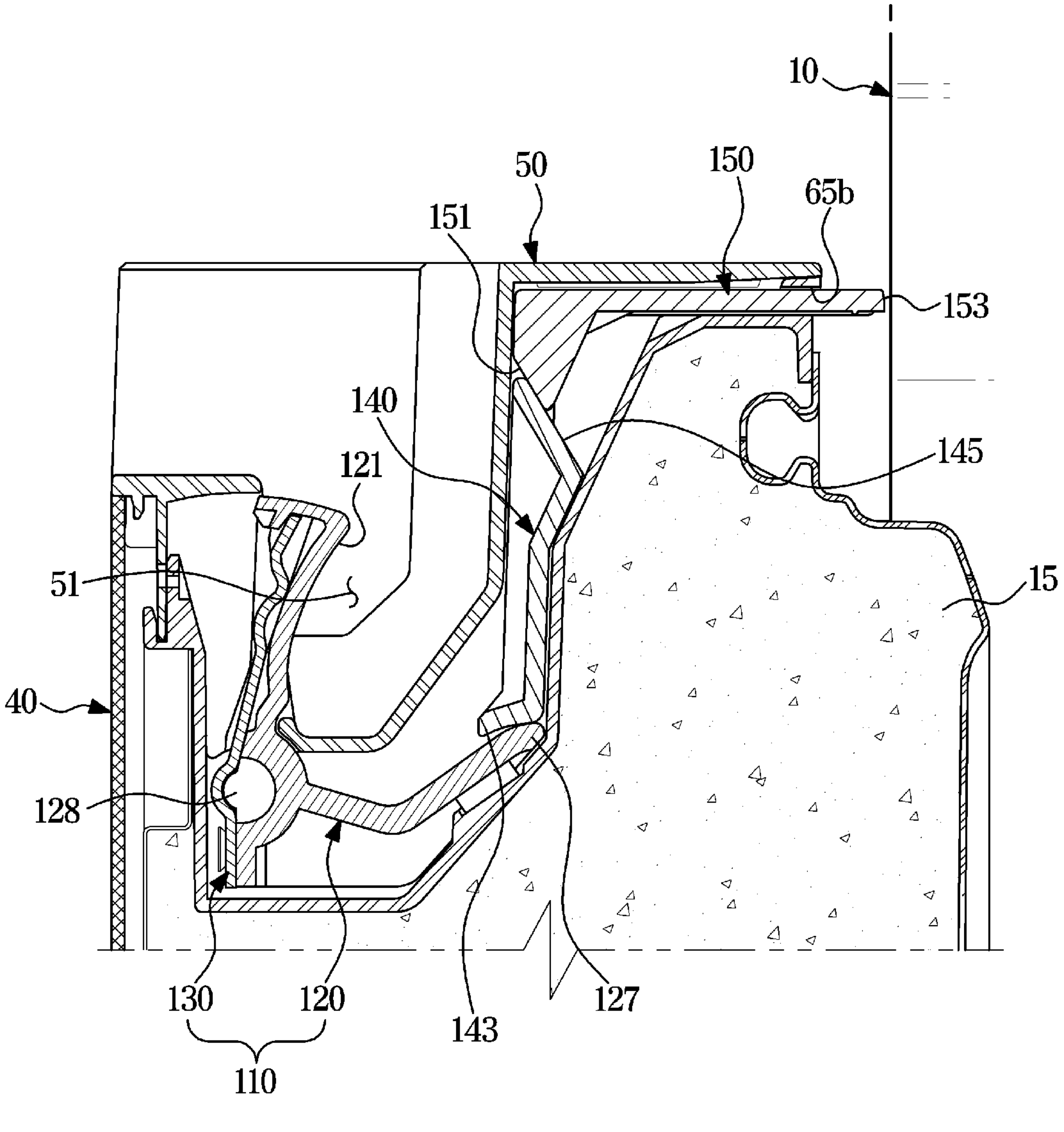
FIG. 15 is a cross-sectional view illustrating a state in which a drawer-type door to which a door opening device is assembled is closed according to various embodiments of the present disclosure.
Figure 16:
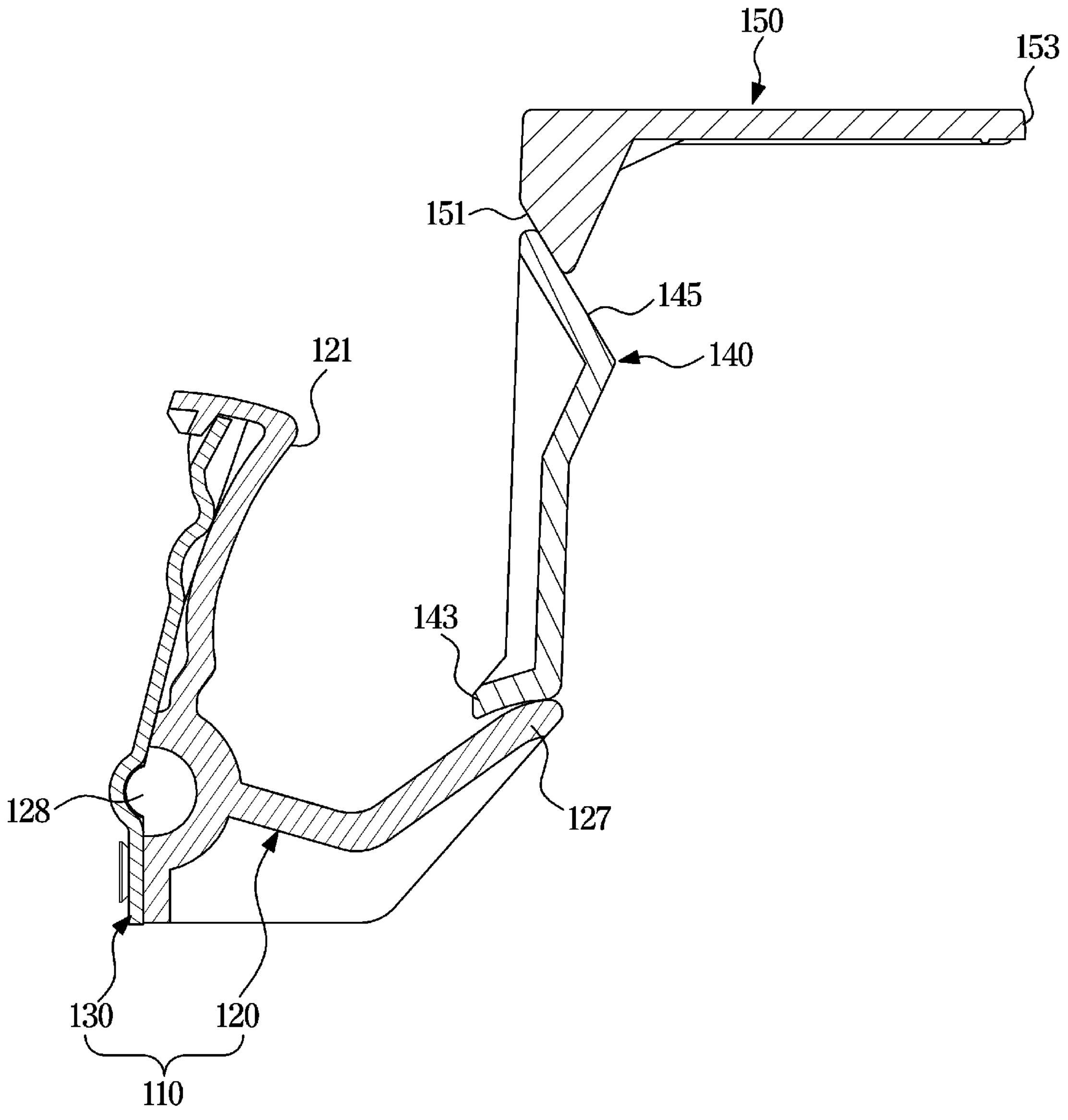
FIG. 16 is a cross-sectional view illustrating a door opening device when a drawer-type door is closed according to various embodiments of the present disclosure.
Figure 17:
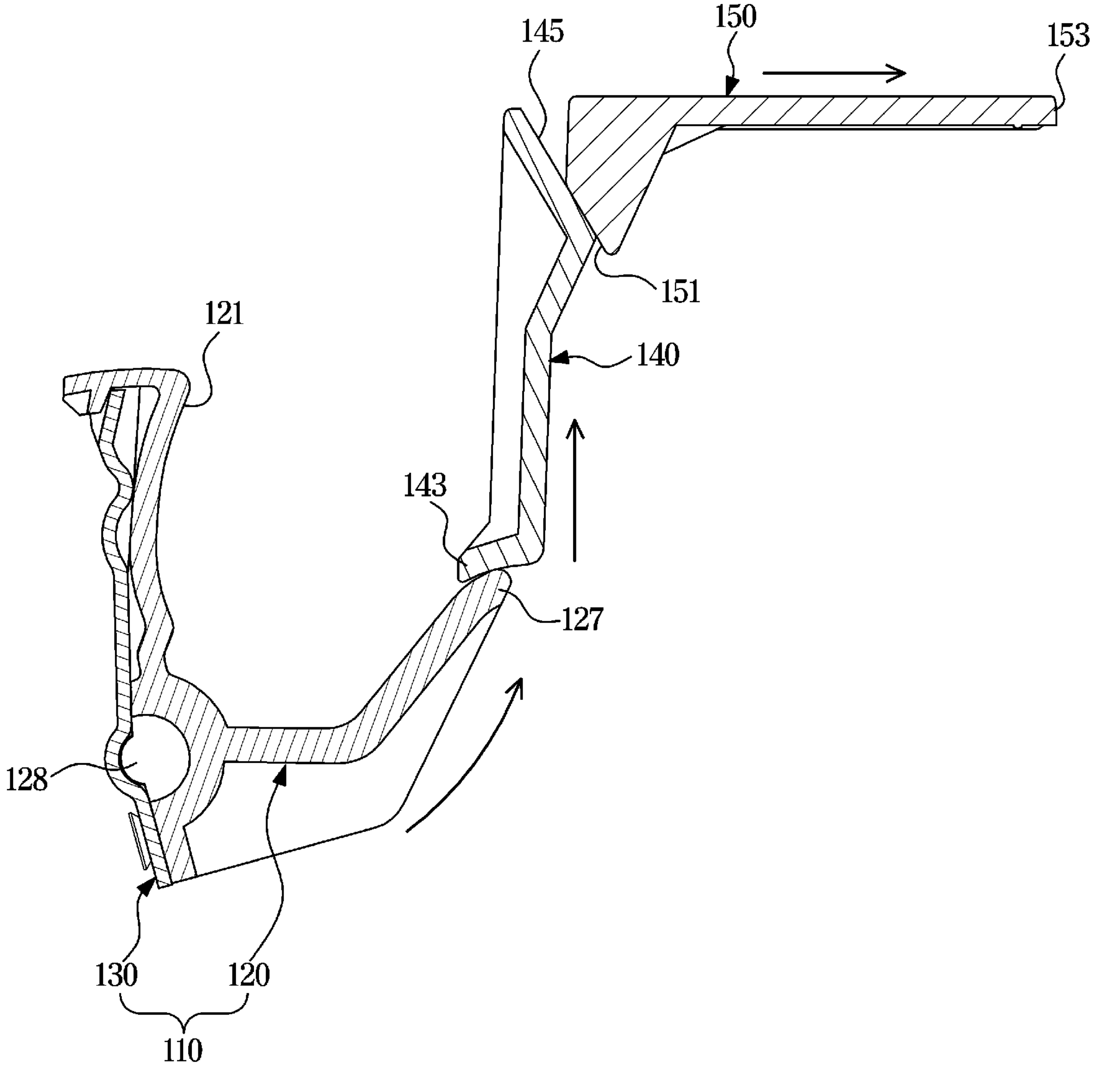
FIG. 17 is a cross-sectional view illustrating an initial state in which a door opening device is operated by rotating a handle lever according to various embodiments of the present disclosure.
Figure 18:
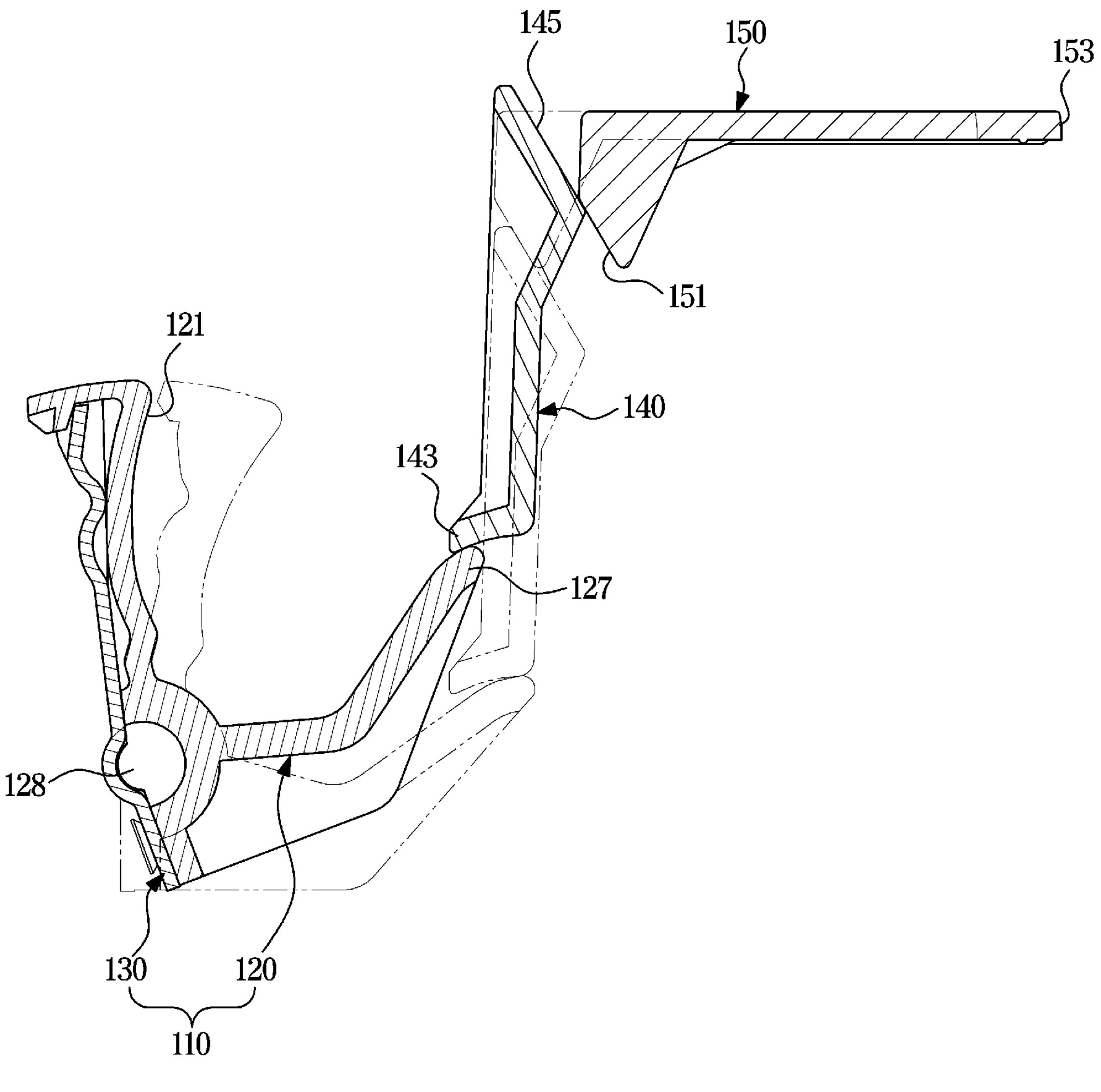
FIG. 18 is a cross-sectional view illustrating a state in which a door opening device is fully operated by rotating a handle lever according to various embodiments of the present disclosure.
Figure 19:
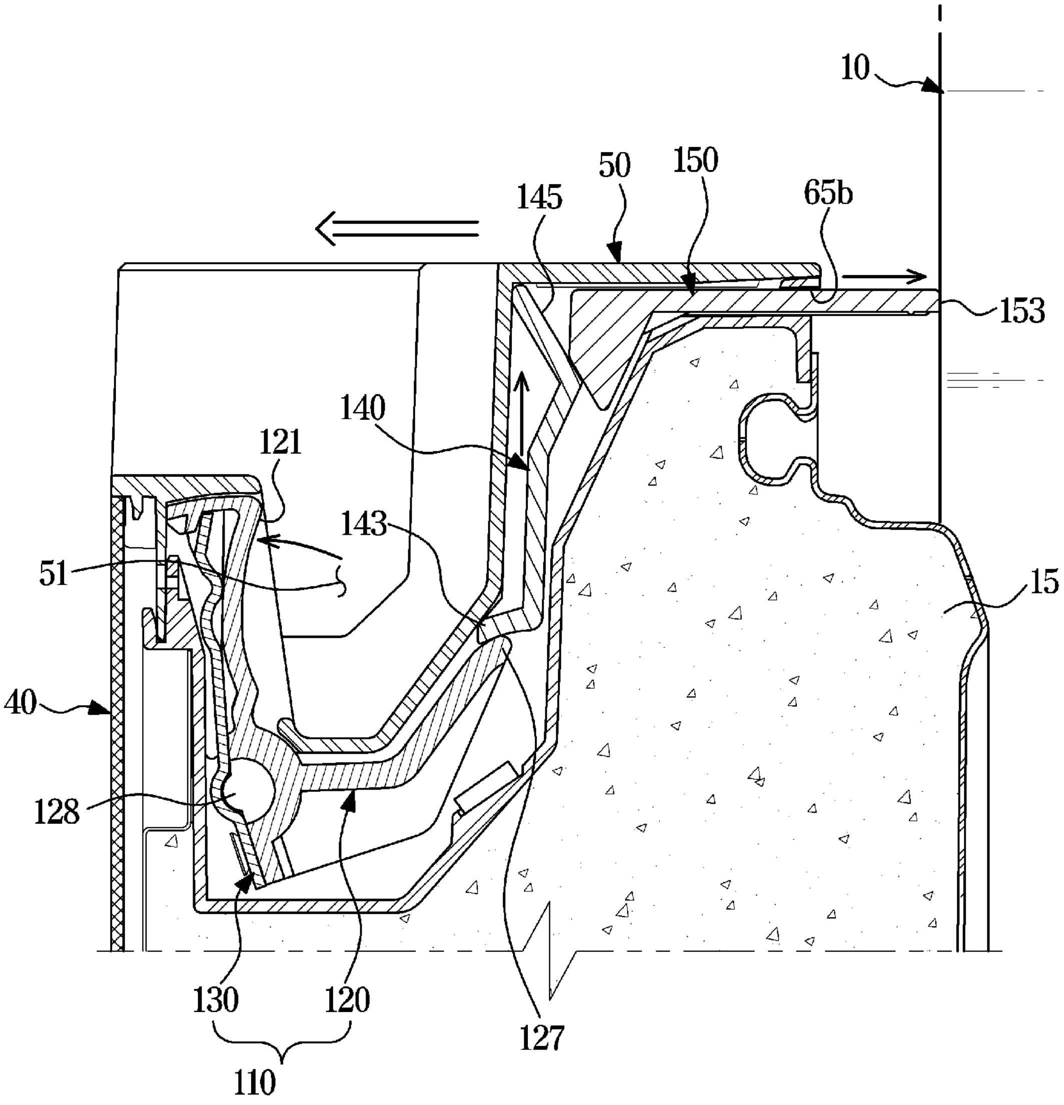
FIG. 19 is a cross-sectional view illustrating a state in which a drawer-type door is opened by a door opening device fully operated according to various embodiments of the present disclosure.

FIG. 15 is a cross-sectional view illustrating a state in which a drawer-type door to which a door opening device is assembled according to various embodiments of the present disclosure is closed. FIG. 16 is a cross-sectional view illustrating a door opening device when a drawer-type door is closed according to various embodiments of the present disclosure. FIG. 17 is a cross-sectional view illustrating an initial state in which a door opening device is operated by rotating a handle lever according to various embodiments of the present disclosure. FIG. 18 is a cross-sectional view illustrating a state in which a door opening device is fully operated by rotating a handle lever according to various embodiments of the present disclosure. FIG. 19 is a cross-sectional view illustrating a state in which a drawer-type door is opened by a door opening device fully operated according to various embodiments of the present disclosure.

Referring to FIGS. 15 and 16, while the drawer-type door 40 is closed, the push portion 153 of the pusher 150 may not be in contact with the main body 10. In this case, the push portion 153 of the pusher 150 may be in a state not pushing the main body 10. That is, the handle lever 110 may be in a state in which the handle lever 110 is maximally rotated clockwise around the plurality of rotation shafts 128 by the elastic force of the elastic member (160 in FIG. 9).

Referring to FIG. 17, when the handle lever 110 is pressed by the user, the handle lever 110 may be rotated counter-clockwise around the plurality of rotation shafts 128. When the handle lever 110 is rotated counterclockwise around the plurality of rotation shafts 128, the pressing portion 127 of the handle lever 110 is slidably moved along the sliding surface 143 of the slider 140, causing the slider 140 to perform straight linear motion upwards. When the slider 140 performs straight linear motion upward, the second inclined surface 151 of the pusher 150 in contact with the first inclined surface 145 of the slider 140 may be moved along the first inclined surface 145, and thus the pusher 150 may perform straight linear motion backward.

Referring to FIGS. 18 to 19, when the handle lever 110 is completely pressed by the user, the handle lever 110 may be rotated counterclockwise around the plurality of rotation shafts 128. As the handle lever 110 is rotate counterclock-wise around the plurality of rotation shafts 128, the pressing portion 127 of the handle lever 110 is slidably moved along the sliding surface 143 of the slider 140 up to the end of the sliding surface 143, causing the slider 140 to perform straight linear motion upward.

When the slider 140 performs straight linear motion upward, the second inclined surface 151 of the pusher 150 may be slidably moved along the first inclined surface 145 of the slider 140, and thus the pusher 150 may perform straight linear motion in a direction toward the main body 10. When the main body 10 is pushed by the pusher 150, the drawer-type door 40 may be moved forward and opened. That is, the drawer-type door 40 may be moved in a direction away from the main body 10 and opened. In this case, the elastic member (160 in FIG. 9) may be in a state being compressed by the handle lever 110.

When the user removes the force pressing the handle lever 110, the handle lever 110 may be rotated clockwise around the plurality of rotation shafts 128 by the compressive force of the compressed elastic member (160 in FIG. 9). When the handle lever 110 is rotated clockwise around the plurality of rotation shafts 128, the handle lever 110 may return to its original position, as shown in FIG. 15, and the slider 140 and the pusher 150 may also return to their original positions together with the handle lever 110.

Figure 20:
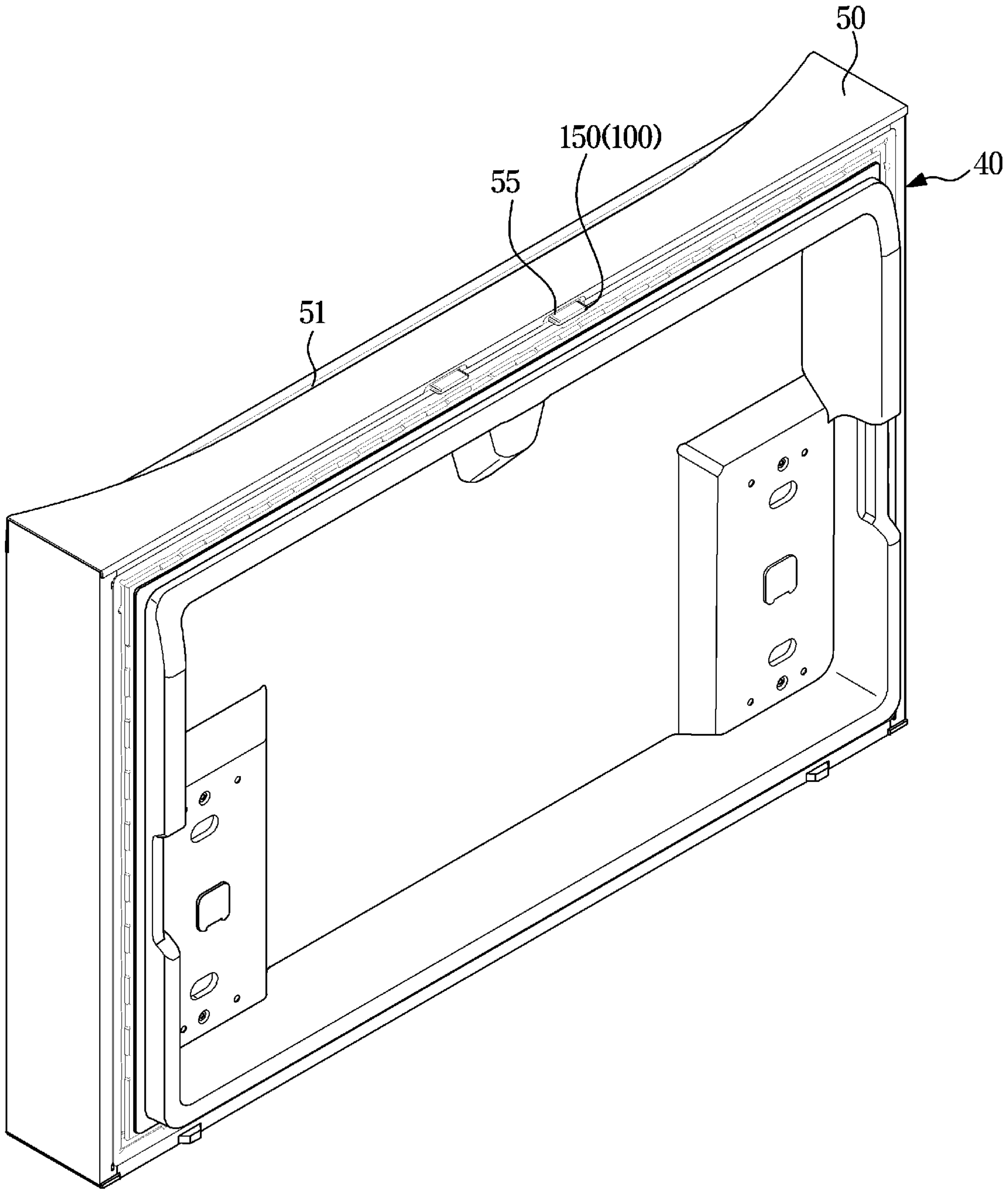
FIG. 20 is a view illustrating a state in which a door opening device provided with two pushers is assembled to a drawer-type door according to various embodiments of the present disclosure.
Figure 21:
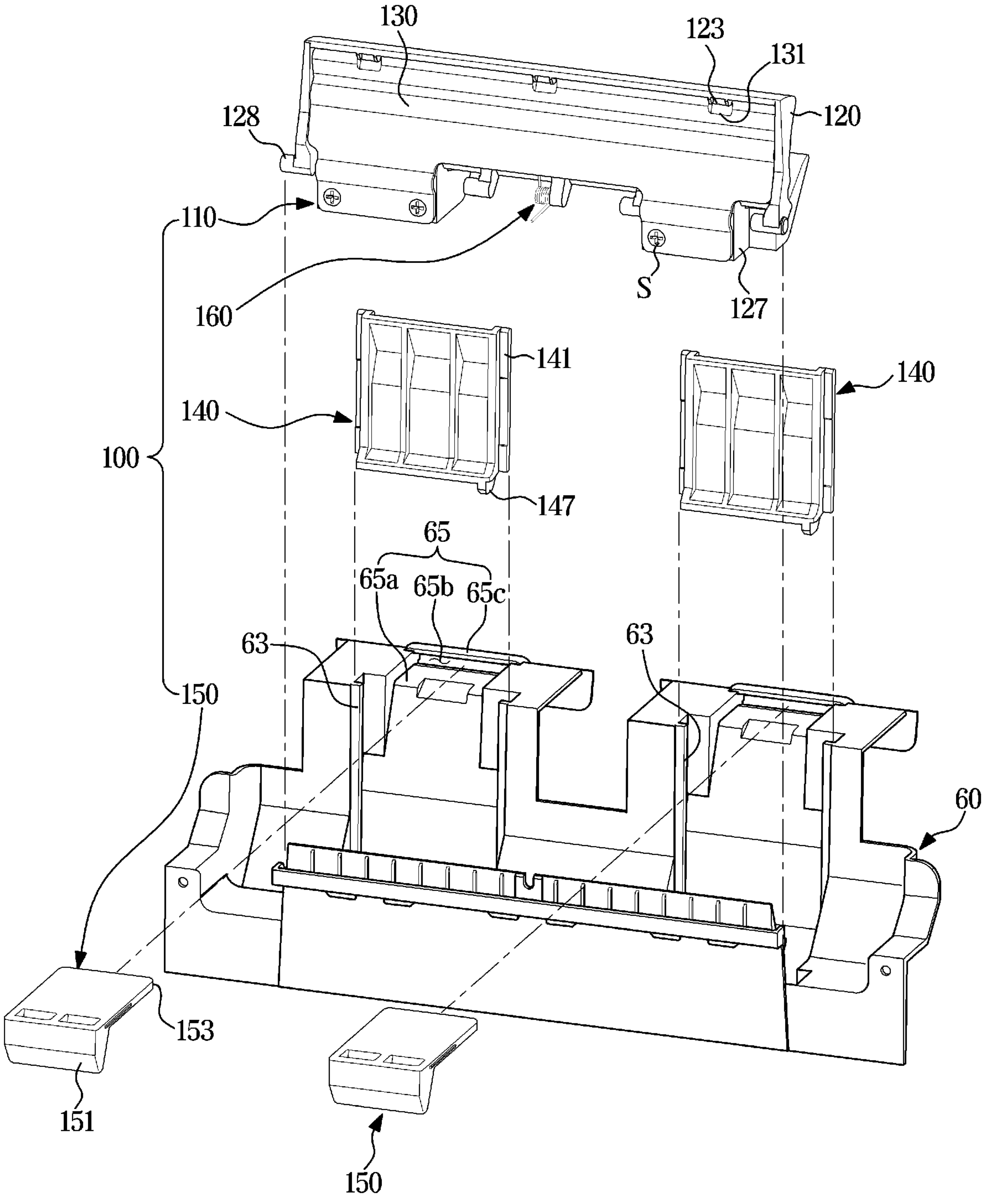
FIG. 21 is a view illustrating a state in which the door opening device shown in FIG. 20 is assembled to a door bracket.

FIG. 20 is a view illustrating a state in which a door opening device provided with two pushers is assembled to a drawer-type door according to various embodiments of the present disclosure. FIG. 21 is a view illustrating a state in which the door opening device shown in FIG. 20 is assembled to a door bracket;

Referring to FIGS. 20 and 21, the pusher 150 may be provided on both left and right sides with respect to the central portion of the door bracket 60. That is, the pushers 150 may be provided as a pair. Since the pushers 150 are provided as a pair, the slider 140 for moving the pusher 150 may also be provided as a pair. Since the sliders 140 and the pushers 150 are provided as a pair, the pressing portion 127 of the handle lever 110 may also be provided as a pair to correspond thereto. In addition, to correspond to the door opening device 100 provided as a pair, some components of the door bracket 60 to which the door opening device 100 is assembled may also be provided as a pair. In addition, the second opening portion 55 formed in the door cap 50 for straight linear motion of the pusher 150 may also be pro-vided as a pair. Although some components of the door opening device 100 are provided as a pair as described above, detailed configurations may be the same as those of the door opening device 100 shown in FIG. 5. That is, except that some components of the door opening device 100 are provided as a pair, all other components may be the same as those shown in FIG. 5. However, the assembly position of the elastic member 160 may be different from that of the door opening device shown in FIG. 5. In addition, although not shown in the drawings, since the assembly position of the elastic member 160 is different, the position of the elastic member support groove 129 in which one end of the elastic member 160 is supported may also be different.

As described above, when the pusher 150 is provided as a pair, the door opening device 100 may operate more stably to open the drawer-type door 40. That is, since the pair of pushers 150 push the main body 10, the drawer-type door 40 may be stably opened without an operation error.

Figure 22:
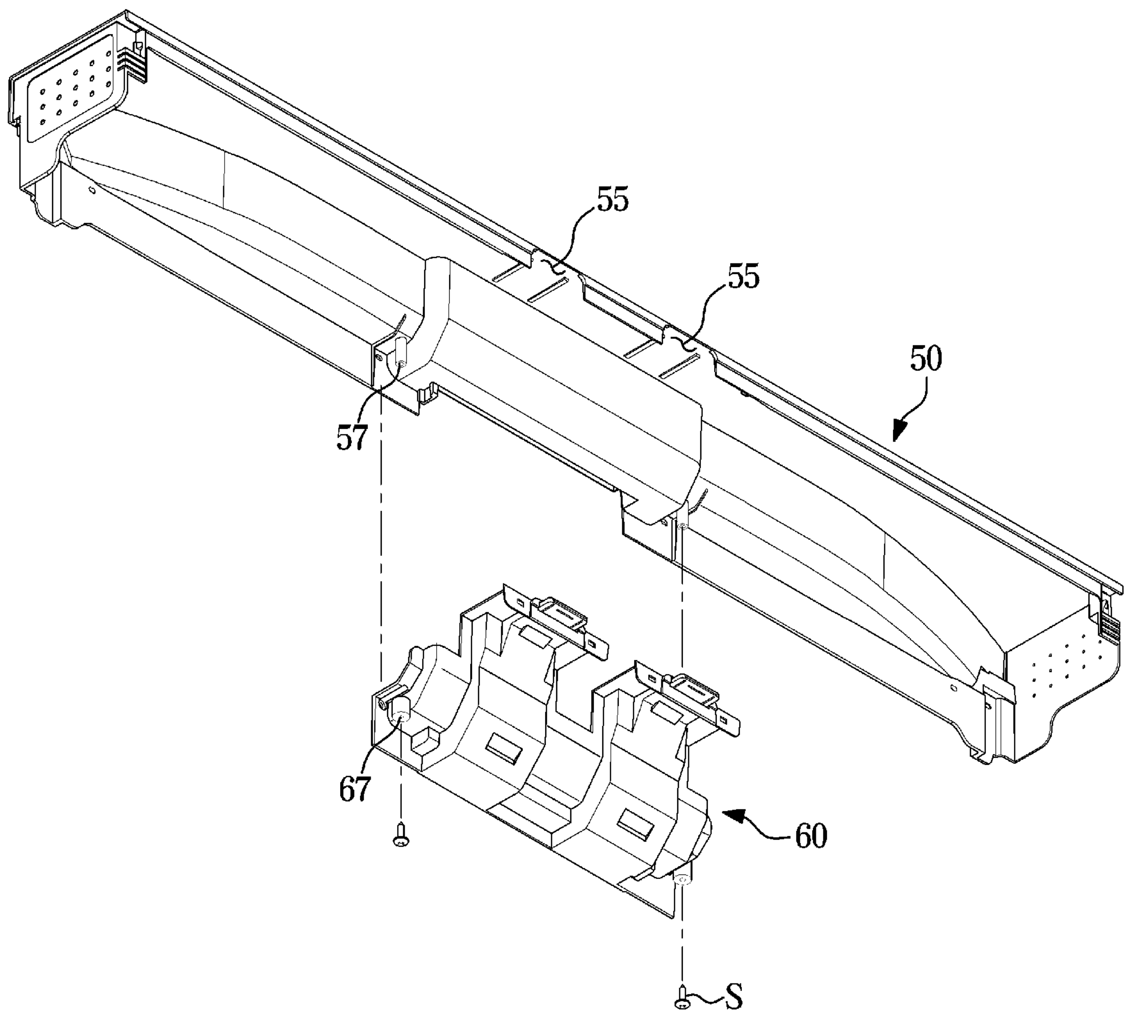
FIG. 22 is a view illustrating a state in which a door bracket to which a door opening device is assembled is assembled to a lower end of a door cap according to various embodiments of the present disclosure.

FIG. 22 is a view illustrating a state in which a door bracket to which a door opening device is assembled accord-ing to various embodiments of the present disclosure is assembled to a lower end of a door cap.

Referring to FIG. 22, except that some components of the door opening device 100 are provided as a pair and thus some components of the door bracket 60 are provided as a pair, the remaining may be the same as the configuration in which the door bracket 60 is assembled to the lower end of the door cap 50 shown in FIG. 13.

Figure 23:
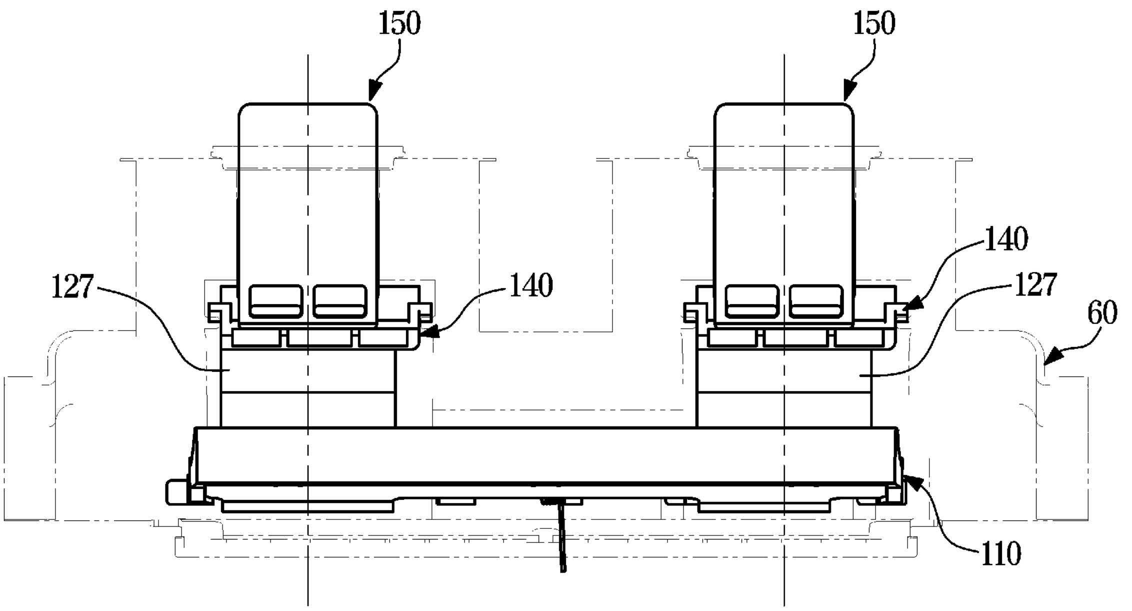
FIG. 23 is a view illustrating a state in which the centers of a pressing portion, a slider, and a pusher are located on the same line according to various embodiments of the present disclosure.

FIG. 23 is a view illustrating a state in which the centers of a pressing portion, a slider, and a pusher are located on the same line according to various embodiments of the present disclosure.

Referring to FIG. 23, the centers of the pressing portion 127, the slider 140, and the pusher 150 may be located on the same line. Since the centers of the pressing portion 127, the slider 140, and the pusher 150 are located on a same straight line, the shortening of the moving distance of the pusher 150 due to bending of the handle lever 110 may be reduced.

As is apparent from the above, according to embodiments of the disclosure, the door opening device for opening a drawer-type door having a recessed handle can operate efficiently even in a narrow space.

In addition, the door opening device is prevented from being exposed to the outside, thereby improving external appearance.

In addition, the drawer-type door can be easily opened using a small force.

In addition, the insulation thickness of the drawer-type door can be sufficiently ensured.

In addition, assembly of the door opening device can be facilitated, and rigidity and durability of the assembly can be improved.

The effects of the present invention are not limited to those described above, and other effects not described above will be clearly understood by those skilled in the art from the above detailed description.

A specific shape and a specific direction of a refrigerator have been described above with reference to the accompanying drawings, but the present disclosure may be variously modified and changed by those skilled in the art, and the modifications and changes should be interpreted as being included in the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A refrigerator comprising:

a main body;

a storage compartment provided inside the main body with a front side that is open;

a drawer-type door slidably coupled to the main body and configured to open and close the storage compartment;

a door cap assembled to an upper portion of the drawer-type door, the door cap having a handle pocket; and a door opening device coupled to the door cap and configured to open the drawer-type door, wherein the door opening device includes:

a handle lever rotatably coupled to the door cap, the handle lever including a bracket that includes a plurality of catching hooks and a reinforcing member that is coupled with the catching hooks and is configured to reinforce the bracket;

a slider disposed at a rear of the handle lever and configured to perform straight linear motion in an upper-to-lower direction by the handle lever; and a pusher coupled at a rear of the slider and configured to:

perform straight linear motion in a front-to-rear direction, and while the slider is moving upward, perform straight linear motion rearward to press the main body so as to open the drawer-type door.

2. The refrigerator of claim 1, wherein:

the slider includes a first inclined surface configured to be in contact with the pusher, and the pusher includes a second inclined surface formed to correspond to the first inclined surface and configured to, while the slider is moving upward, slide along the first inclined surface such that the pusher moves rearward.

3. The refrigerator of claim 1, further comprising:

a door bracket coupled to a central area of a lower end of the door cap, wherein the door opening device is coupled to the door bracket.

4. The refrigerator of claim 3, wherein the door bracket includes:

a handle lever assembly portion rotatably coupled with the handle lever;

a slider assembly portion including a first guide rail coupled to the slider such that the slider is guided for straight linear motion in an upper-to-lower direction; and a pusher assembly portion coupled to the pusher such that the pusher has straight linear motion in a front-to rear direction.

5. The refrigerator of claim 4, wherein:

the handle lever assembly portion includes a recessed portion formed as a recess from a surface of the handle lever assembly portion and configured to accommodate a part of the handle lever, and a plurality of rotation holes formed in the recessed portion for rotatably coupling with the handle lever.

6. The refrigerator of claim 5, wherein the bracket including a part that is exposed to the handle pocket.

7. The refrigerator of claim 6, wherein the bracket includes:

a gripping portion exposed to the handle pocket, a pressing portion configured to press the slider when the handle lever is rotated, and a plurality of rotation shafts integrally formed with the bracket and rotatably coupled to the plurality of rotation holes.

8. The refrigerator of claim 7, wherein the slider includes:

a guide protrusion configured to guide the slider for movement along the first guide rail;

a sliding surface obliquely formed such that the pressing portion slidably moves while in contact with the sliding surface; and a separation preventing protrusion configured to prevent separation of the handle lever coupled to the handle lever assembly portion.

9. The refrigerator of claim 4, wherein the pusher assembly portion includes:

a second guide rail configured to guide the pusher for straight linear motion in the front-to-rear direction; and a separation preventing bar forming an opening between the second guide rail and the separation preventing bar and configured to prevent separation of the pusher moving along the second guide rail, wherein the opening is formed to be open for the slider to push the main body.

10. The refrigerator of claim 7, wherein the door opening device further includes an elastic member coupled to one of the plurality of rotation shafts such that the handle lever subjected to the rotation returns to an original position when a force applied to the handle lever is removed.

11. The refrigerator of claim 10, wherein the elastic member is prevented from separating from the one of the plurality of rotation shafts by the reinforcing member that is coupled to the bracket.

12. The refrigerator of claim 11, wherein the bracket further includes an elastic member support groove configured to support one end of the elastic member.

13. The refrigerator of claim 12, wherein the elastic member has the one end supported by the elastic member support groove and another end supported by the door bracket.

14. The refrigerator of claim 1, wherein the handle lever, the slider, and the pusher are disposed to have centers located on a same line.

15. The refrigerator of claim 3, wherein:

the slider and the pusher are provided as a pair on both left and right sides of a central portion of the door bracket, and a pressing portion formed on the handle lever to press the slider during rotation of the handle lever is provided as a pair to correspond to the pair of sliders.

16. A door opening device for opening a drawer-type door slidably coupled to an inside of a main body, wherein the drawer-type door includes:

a door cap coupled to an upper portion of the drawer-type door, and including a handle pocket recessed downward from a surface of the door cap; and a door bracket coupled to a lower end of the door cap, and coupled to the door opening device, wherein the door opening device includes:

a handle lever rotatably coupled to the door bracket, the handle lever including a bracket that includes a plurality of catching hooks and a reinforcing member that is coupled with the catching hooks and is configured to reinforce the bracket;

a slider disposed at a rear of the handle lever to perform straight linear motion in an upper-to-lower direction by the handle lever; and a pusher coupled at a rear of the slider, and configured to perform straight linear motion by the slider to push the main body so as to open the drawer-type door, wherein the slider is configured to move in an upper-to-lower direction such that a range of rotation of the handle lever increases to increase a moving distance of the pusher.

17. The door opening device of claim 16, wherein the handle lever includes:

a gripping portion exposed to the handle pocket, a pressing portion configured to press the slider when the handle lever is rotated, and a plurality of rotation shafts rotatably coupled to the door bracket.

18. The door opening device of claim 17, wherein the slider includes:

a guide protrusion configured to guide the slider for movement along a first guide rail;

a sliding surface obliquely formed such that the pressing portion slidably moves while in contact with the sliding surface;

a first inclined surface obliquely formed to contact the pusher; and a separation preventing protrusion configured to prevent separation of the handle lever coupled to the door bracket.

19. The door opening device of claim 18, wherein the pusher includes:

a second inclined surface formed to correspond to the first inclined surface and configured to, while the slider is moving upward, slide along the first inclined surface such that the pusher moves rearward; and a push portion configured to push the main body.

20. The door opening device of claim 19, wherein the door opening device further includes an elastic member coupled to one of the plurality of rotation shafts, and having one end supported by the handle lever and another end supported by the door bracket such that the handle lever subjected to the rotation returns to an original position when a force applied to the handle lever is removed.

* * * * *